(12) United States Patent
Terunuma et al.

(10) Patent No.: US 6,329,211 B1
(45) Date of Patent: Dec. 11, 2001

(54) METHOD OF MANUFACTURING THIN FILM MAGNETIC HEAD

(75) Inventors: Koichi Terunuma; Tetsuya Mino; Katsuya Kanakubo; Osamu Matsuda, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/405,005

(22) Filed: Sep. 27, 1999

(30) Foreign Application Priority Data

Sep. 29, 1998 (JP) .................................................. 10-276246

(51) Int. Cl.$^7$ ...................................................... G11B 5/31
(52) U.S. Cl. ............................ 438/3; 29/603.15; 360/126
(58) Field of Search ............................. 438/3; 29/603.13, 29/603.14, 603.15; 360/110, 126, 125

(56) References Cited

U.S. PATENT DOCUMENTS

| | | |
|---|---|---|
| 5,285,340 | 2/1994 | Ju et al. . |
| 5,438,747 | 8/1995 | Krounbi et al. . |
| 5,452,164 | 9/1995 | Cole et al. . |
| 5,874,010 | * 2/1999 | Tao et al. . |
| 5,966,800 | * 10/1999 | Huai et al. . |
| 5,996,213 | * 12/1999 | Shen et al. . |
| 6,067,703 | * 5/2000 | Takashi et al. . |

OTHER PUBLICATIONS

T. T. Lam, Y. Luo, J.–G. Zhu, H.–C. Tong, and R. Rottmayer, "Recording Performance of Submicron Track Width Thin Film Heads," J. Appl. Phys. 79 (8), Apr. 15, 1996, pp. 5645–5647.*

* cited by examiner

Primary Examiner—Charles Bowers
Assistant Examiner—Stephen W. Smoot
(74) Attorney, Agent, or Firm—Oliff & Berridge PLC

(57) ABSTRACT

A first magnetic film to constitute a first yoke part and a first pole part is formed in a given pattern on a substrate, and a write gap film is formed on the part corresponding to the first pole portion of the first magnetic film. Then, a second magnetic film having a second pole portion and a second yoke part is formed on the write gap film by a photolithography so that the second pole portion can have a width of 1.5–2.5 $\mu$m. Thereafter, the sides of the second pole portion are etched by an ion beam etching method to narrow its width, and the write gap film is removed by using, as a mask, the second pole portion to expose the first magnetic film. Subsequently, the exposed first magnetic film is partially removed to form the first pole portion and thereby a thin film magnetic head having a pole portion with a track width of not more than 1 $\mu$m beyond the limit of the photolithography is produced.

18 Claims, 19 Drawing Sheets

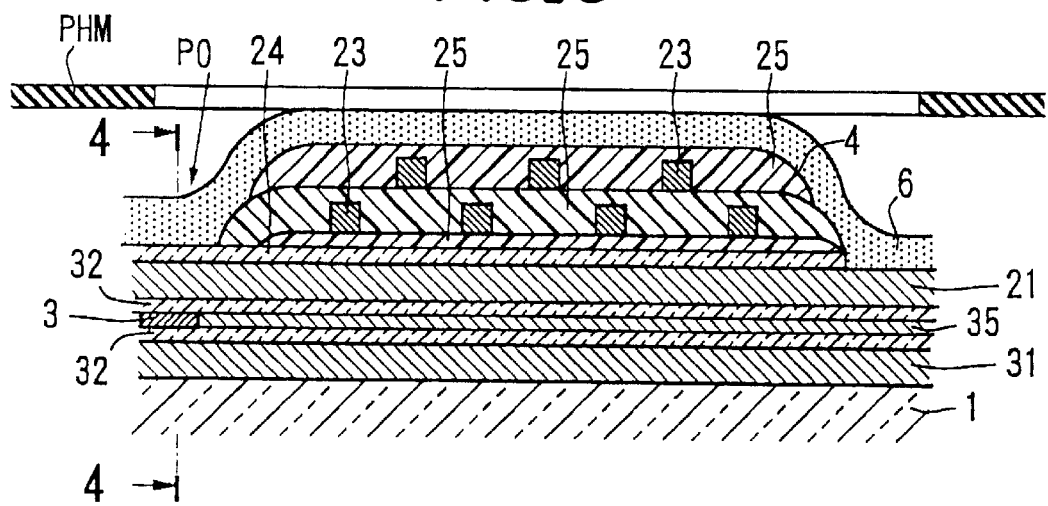
FIG_3
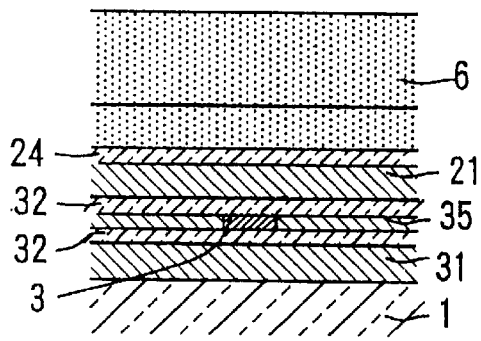
FIG_4
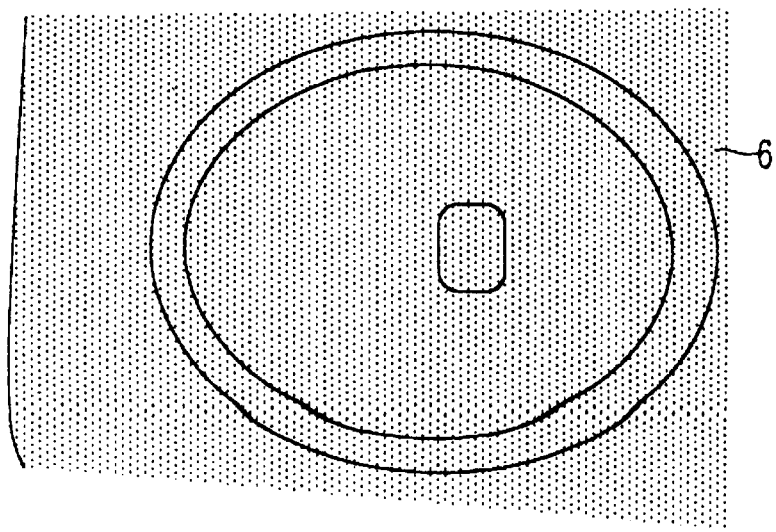
FIG_5

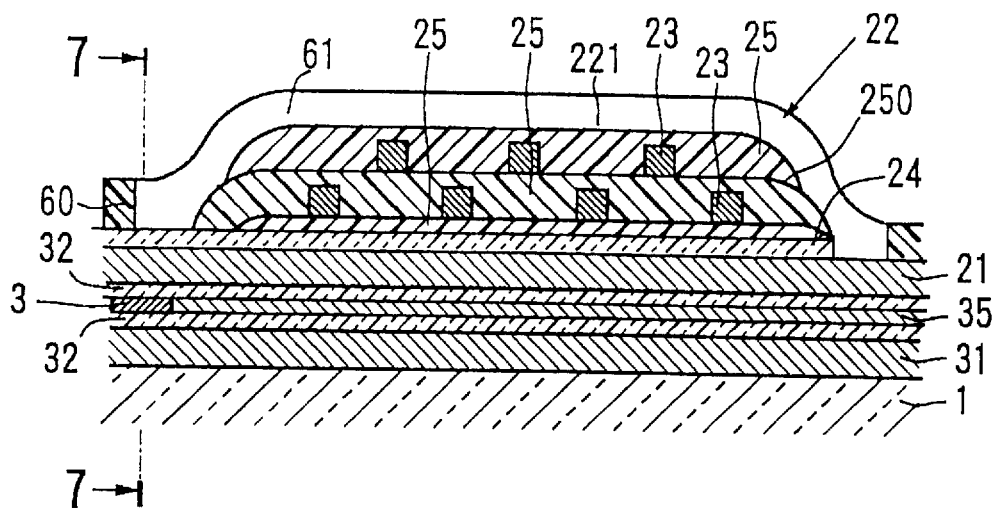
FIG._6
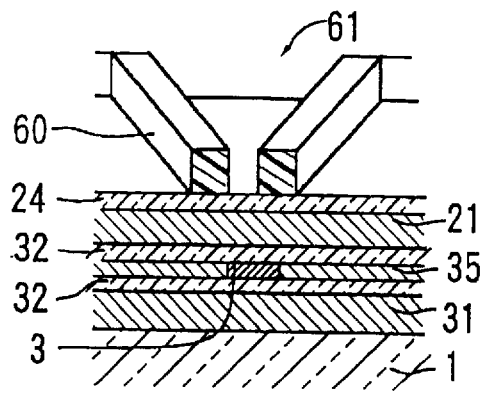
FIG._7
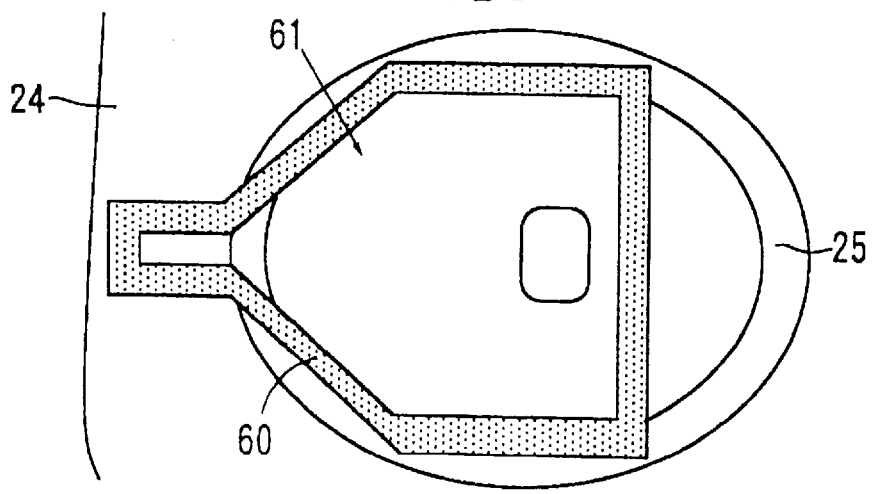
FIG._8

FIG_9
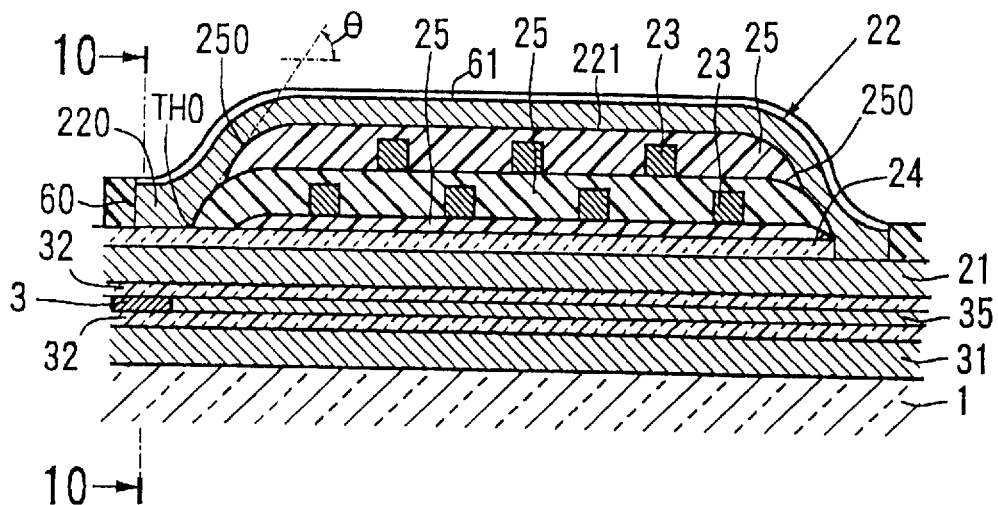
FIG_10
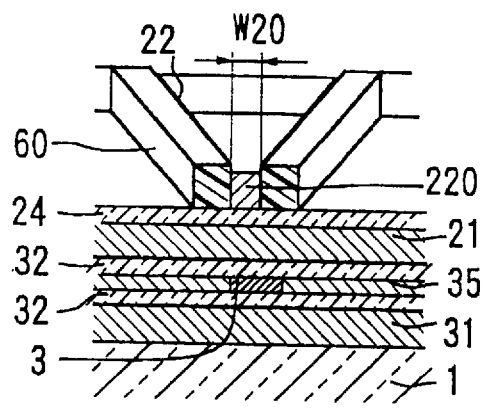
FIG_11
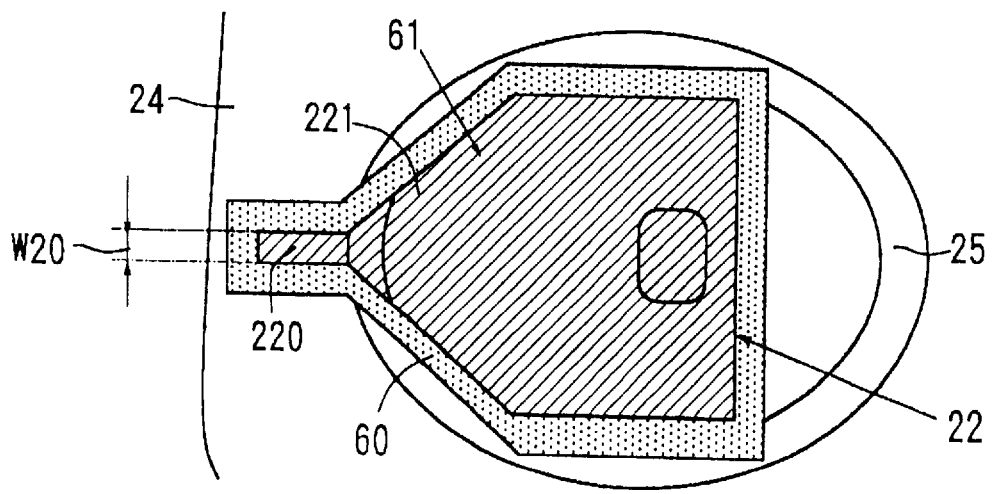

FIG._12
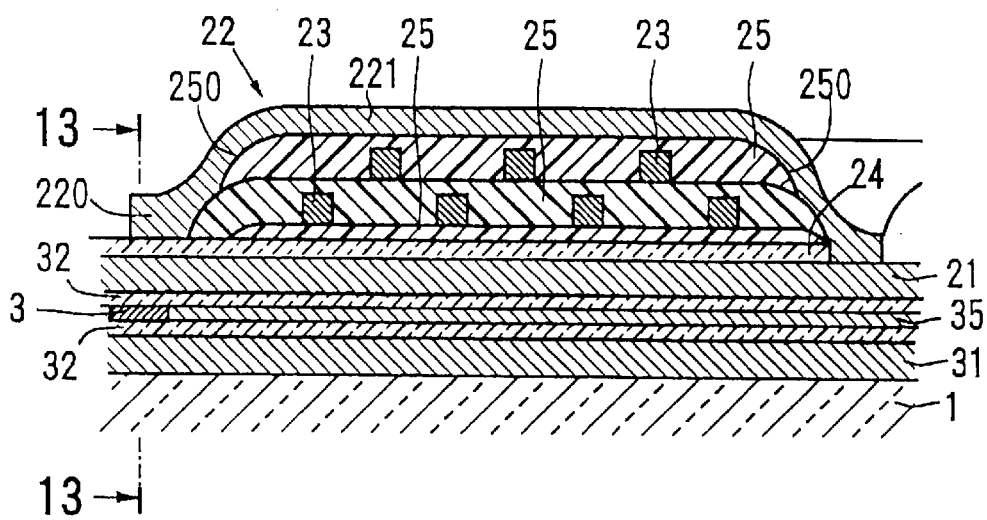
FIG._13
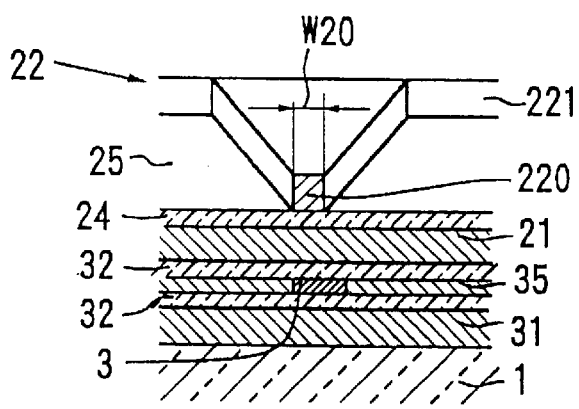
FIG._14
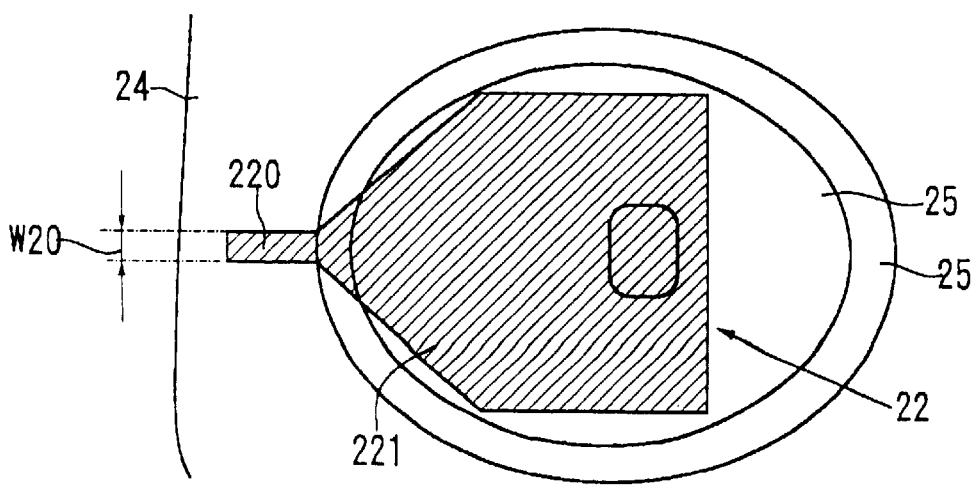

FIG_15
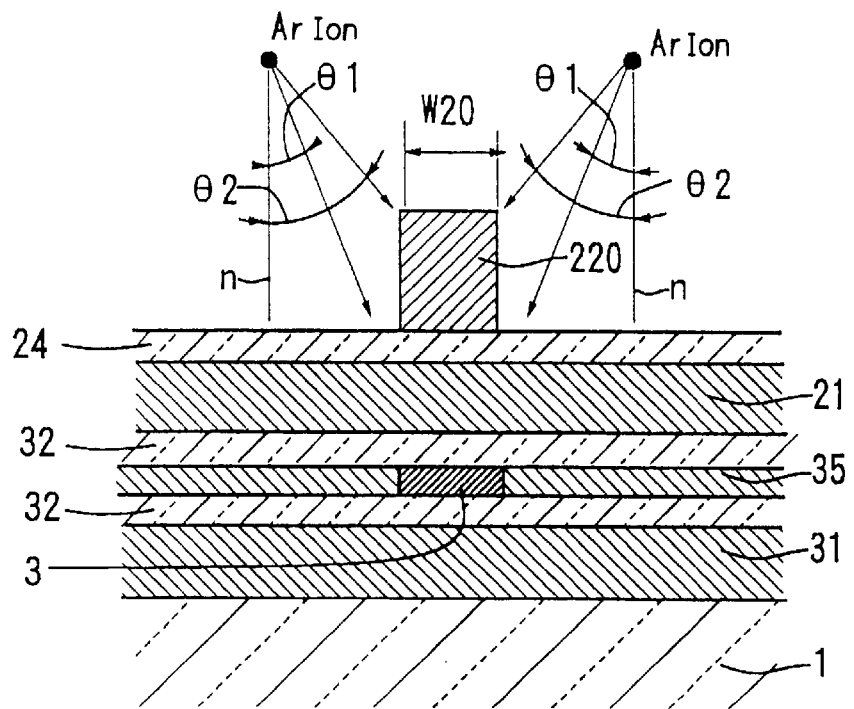
FIG_16
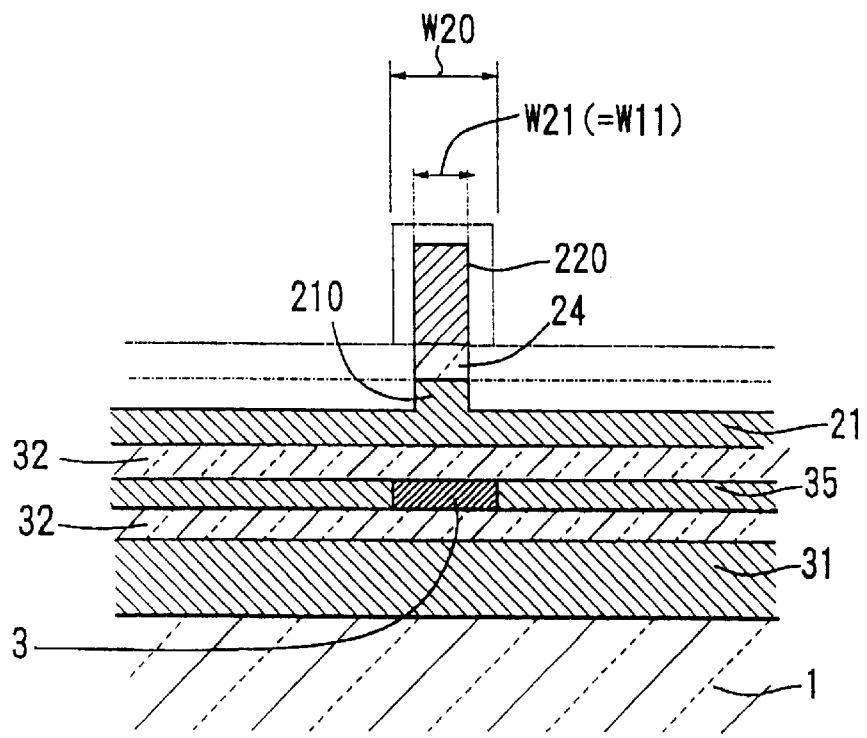

FIG_19
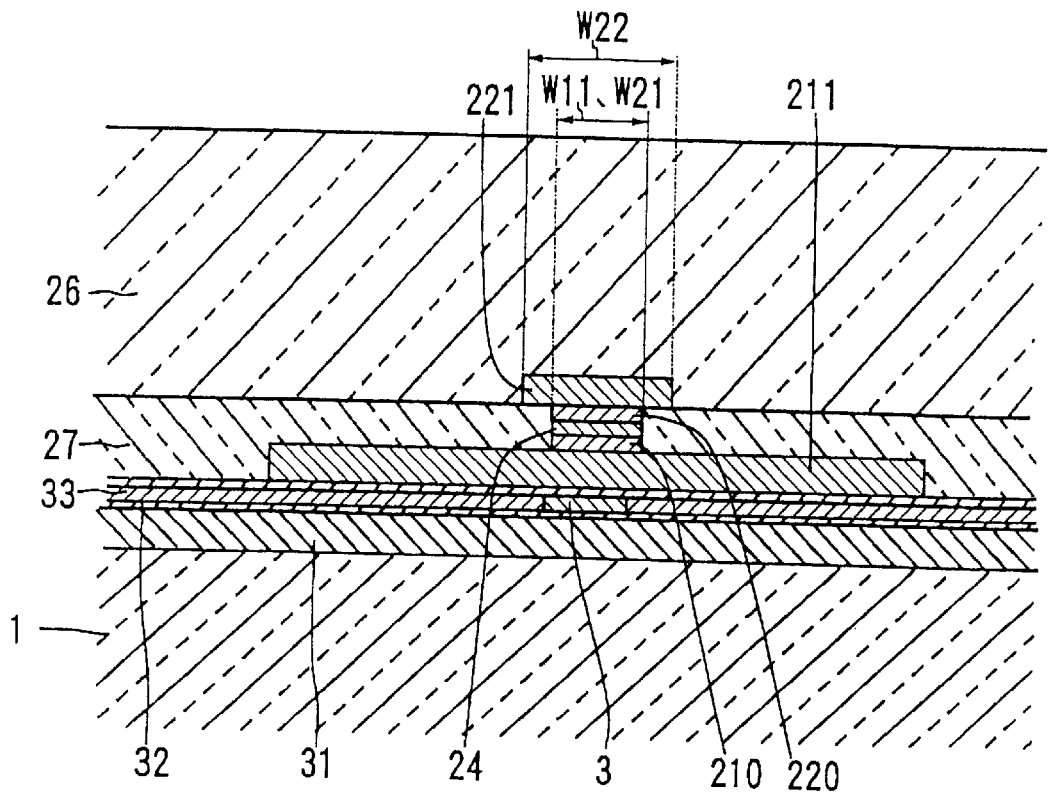
FIG_20
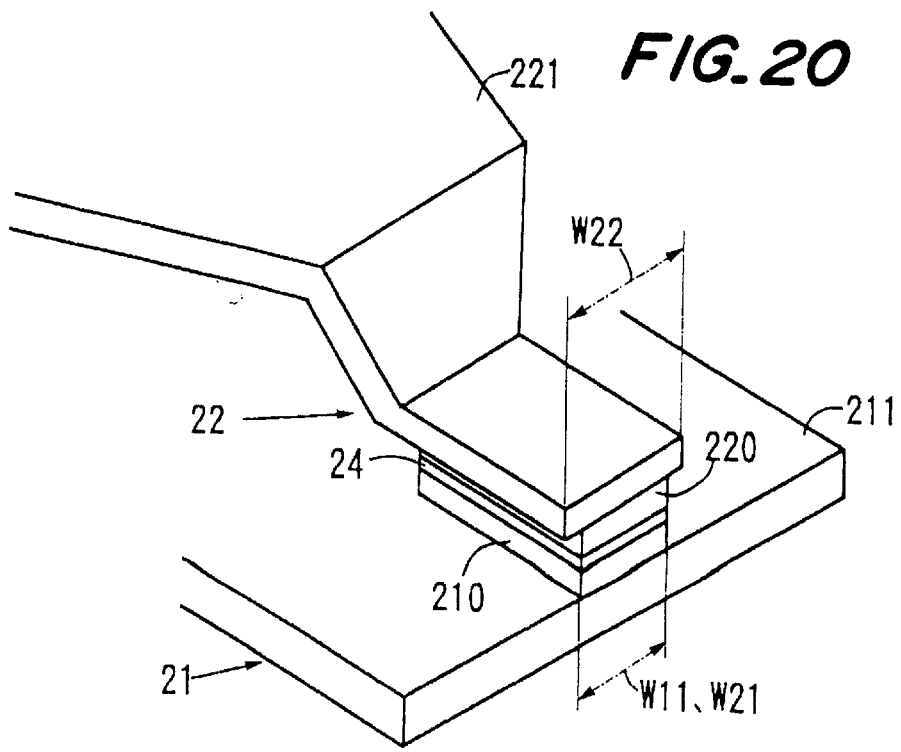

FIG_21
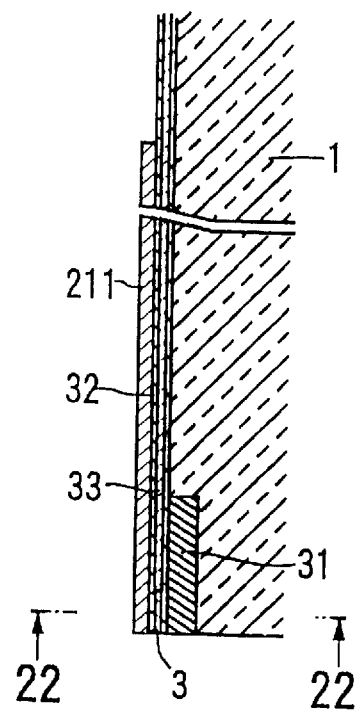
FIG_22
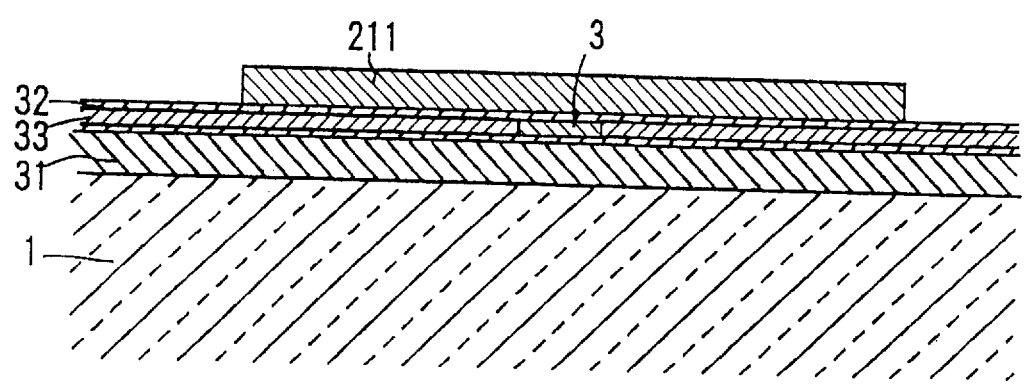

FIG_31
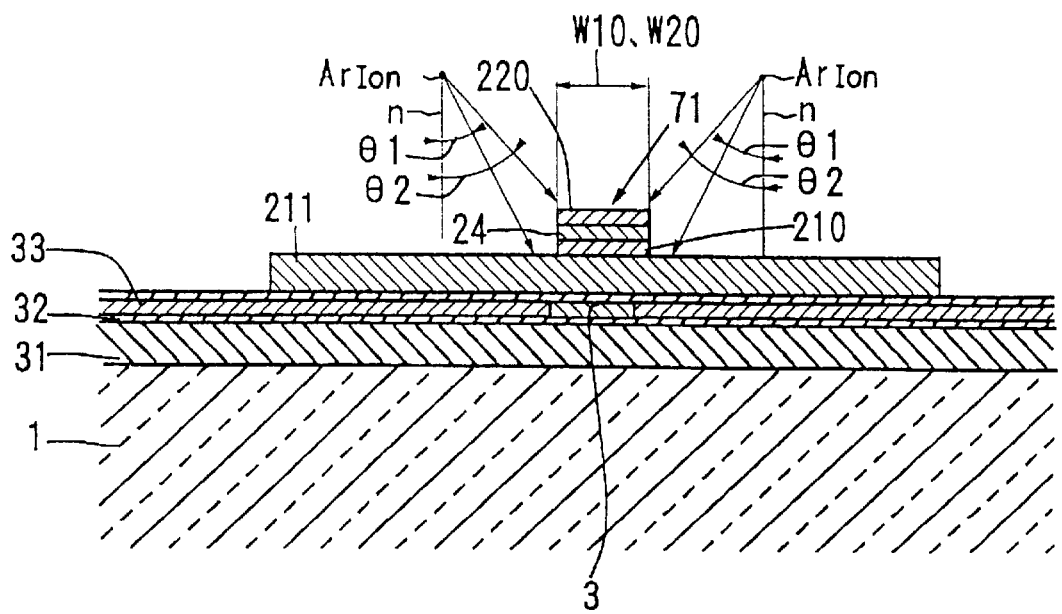
FIG_32
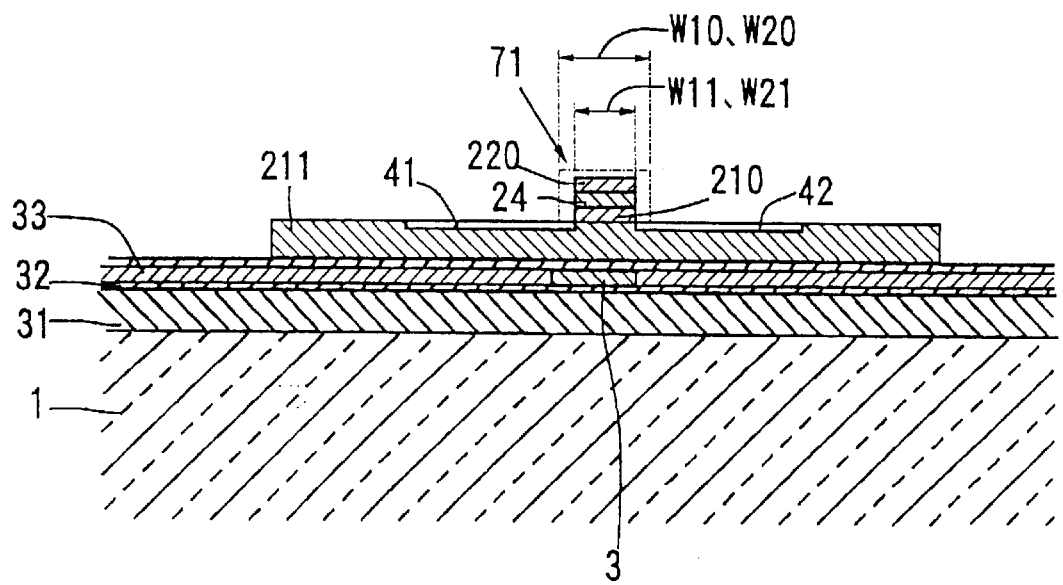

FIG_33
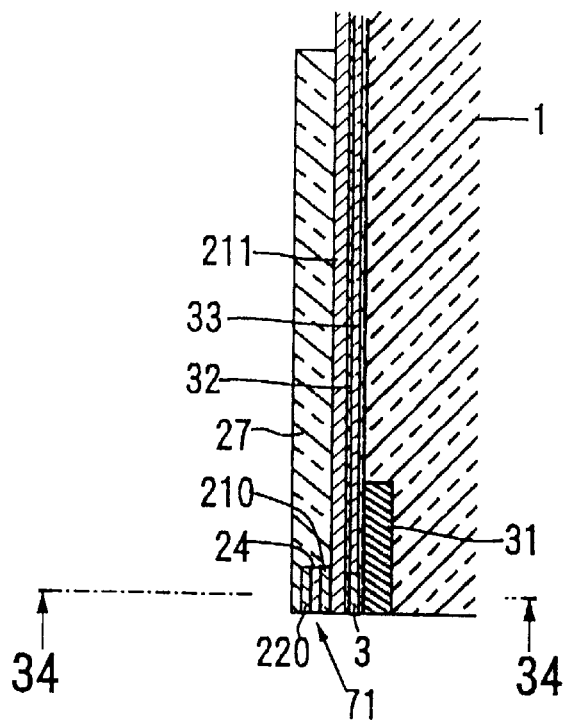
FIG_34
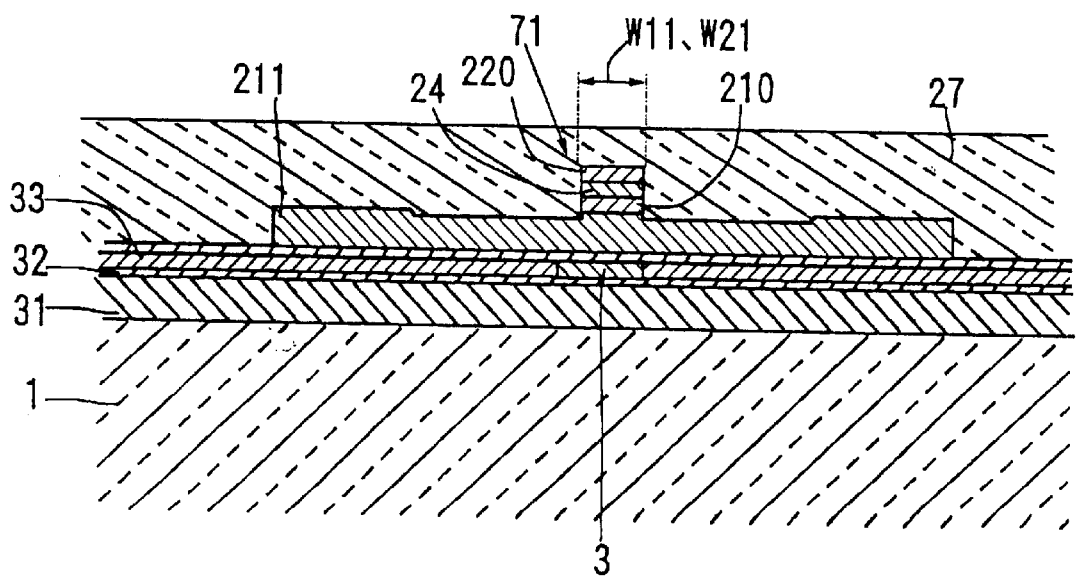

METHOD OF MANUFACTURING THIN FILM MAGNETIC HEAD

BACKGROUND OF THE INVENTION

1. Field of the Invention

This invention relates to a method of manufacturing a thin film magnetic head usable for a magnetic recording and reading device such as a magnetic disk device, particularly to a method of manufacturing a thin film magnetic head with an inductive type thin film magnetic head for writing having a first magnetic member including a first pole portion and a first yoke part, a second magnetic member including a second pole portion constituting an air bearing surface (often abbreviated to "ABS") opposing to the first pole portion via a write gap film and to a magnetic recording medium as well as the first pole portion and a second yoke part magnetically connected to the first yoke part in the position apart from the air bearing surface, and a thin film coil including the part surrounded by the first and second magnetic members.

2. Related Art Statement

As a thin film magnetic head usable for a magnetic disk device constituting a memory device in a computer, a composite type thin film magnetic head has been mainly used in which an inductive type thin film magnetic head is employed as a writing element and a magnetoresistive effective type thin film magnetic head is employed as a reading element.

For realizing a high density recording using such a thin film magnetic head, data capacity (surface recording density) to be stored in a unit area of a magnetic disk has to be increased. The surface recording density firstly depends on a performance of a writing element. The surface recording density can be enhanced by shortening the gap length of the writing pole in the writing element. However, the shortening of the gap length is restricted in itself because it causes the magnetic flux in the writing pole to be decreased.

The other means to develop the surface recording density is to increase data track number able to be recorded in a magnetic disk. The track number capable of being recorded in a magnetic disk is represented as TPI (track per inch). The TPI of the writing element can be enhanced by minifying the head size to define the width of the data track. The head size is usually denominated as the track width of the head.

The narrowing the track width is disclosed in various publicly known documents. For example, the specifications of U.S. Pat. No. 5,438,747 and U.S. Pat. No. 5,452,164 disclose the method that a first pole portion is etched by ion beam milling with a second pole portion obtained by photolithography as a mask so that its track width can be equal to the track width of the second pole portion.

Moreover, the specification of U.S. Pat. No. 5,285,340 disclose the following method:

After a first magnetic yoke layer (first yoke part) is formed, a photoresist layer is stuck and an opening is provided to form, on the photoresist layer, a magnetic pole end assembly composed of a first pole portion, a write gap film and a second pole portion into a desired pattern. Then, after the magnetic pole end assembly is formed in the opening, the part of the photoresist layer positioning in the front of the magnetic pole end assembly is removed. Thereafter, a thin film coil, an insulating film, etc. are formed by a conventional method and a second magnetic yoke layer (second yoke part) is formed.

The above technique is to define the track width by using the mask patterned by the photolithography. However, the narrower the track width of the writing pole portion is, the larger the aspect ratio (ratio "t/w" of thickness "t" to width "w") of the magnetic film constituting the writing pole portion is. In the case of defining the track width by using the mask patterned by the photolithography, if the aspect ratio of the magnetic film is larger, inevitably, the ratio of the height of the resist frame to the frame space to define the track width is larger, so that the magnetic film is unlikely to be smoothly plateformed and the magnetic characteristics of the writing pole portion become unstable to degrade the recording performance.

Moreover, the thin film magnetic head has the highly rising coil insulating film to support the thin film coil. Thus, in the process of forming the second yoke part by the photolithography, the photoresist is stuck thickly on the step when the photoresist layer is formed. Consequently, the pattern of the second pole portion formed on the downside of the step has to be patterned through the thick photoresist layer and the aspect ratio (the ratio of the height to the width of the resist) is remarkably large, resulting in the difficulty of narrowing the track width. From the above reasons, in the past, the track width of about 0.8 $\mu$m could be obtained in its limit.

SUMMARY OF THE INVENTION

It is an object of the present invention to provide a method of manufacturing a thin film magnetic head which can set the track width of the writing pole to a minute value beyond the limit of the photolithography precisely.

This invention relates to a method of manufacturing a thin film magnetic head with an inductive type thin film magnetic head having a first magnetic member including a first pole portion and a first yoke part, a second magnetic member including a second pole portion constituting an air bearing surface opposing to the first pole portion via a write gap film and to a magnetic recording medium as well as the first pole portion and a second yoke part magnetically connected to the first yoke part in the position apart from the air bearing surface, a thin film coil including the part surrounded by the first and second magnetic memebers, and a substrate to support the first and second magnetic members and the thin film coil, comprising steps of:

forming a magnetic to constitute at least the first yoke part of the first magnetic member so as to be supported by the substrate, forming at least the second pole portion of the second magnetic member, on the write gap film, in a desired pattern by a photolithography method after the write gap film is formed on the magnetic film, and dry-etching at least the second pole portion to reduce its width.

According to the manufacturing method of the present invention, the writing track width to be defined by the photolithography can be much narrowed by reducing the width of the second pole portion with the dry-etching. Concretely, even the track width of not more than 1 $\mu$m, for example 0.5 $\mu$m, having remarkable difficulty being formed by the photolithography, can be easily realized.

Moreover, in forming the second pole portion using the mask patterned by the photolithography, its width may be larger than the track width to be obtained finally. Thus, in the photolithography process, the ratio (aspect ratio) of the height of the resist frame to the frame space to define the width of the second pole portion can be decreased. Thereby, the magnetic film can be smoothly plate-formed and the magnetic characteristic of the writing pole become stable to prevent the degradation of the recording performance.

In the manufacturing method of the thin film magnetic head according to the present invention, the write gap film and the magnetic film constituting the first magnetic member are etched in etching the second pole portion. In a preferred embodiment, after the magnetic film is formed, on the magnetic film is formed the write gap film, on which the second pole portion is formed by the photolithography. Then, the second pole portion is etched to narrow its width and the write gap film and the part of the magnetic film under the write gap film are partially etched to form the first pole portion. In another preferred embodiment, after the first yoke part is formed, the pole portion including the first and the second pole portion, being opposite each other via the write gap film, is formed in a desired pattern on the first yoke part. Then, the pole portion is etched to narrow its width. In either embodiment, the first and the second pole portions having the same width and the write gap film enable the pole portion having a good shape to be provided.

The dry-etching process to narrow the width of the second pole portion may be preferably performed by an ion beam milling method or a reactive ion etching (RIE) method. In the ion beam milling process, at least two ion incident angles, being different each other, are preferably selected at the different timing. For example, one ion incident angle (a first ion incident angle) is selected to a value suitable for mainly reducing the write gap film and the first pole portion, and the other ion incident angle (a second ion incident angle) is selected to a value suitable for mainly reducing the sides of the second pole portion to decrease the track width. The ion beam milling is carried out at the second incident angle in succession to the first incident angle. Thus, the defining of the track width of the second pole portion and the reducing of the write gap film and the first pole portion corresponding to the track width are effectively performed. The ion incident angles and their irradiation times are most appropriately selected, depending on a material to be etched and its thickness. In the present invention, such ion incident angles and irradiation times are disclosed.

Moreover, in the above first embodiment, it may be that after the second pole portion is mainly etched by the ion beam milling, the write gap film is mainly etched by the reactive ion etching to expose the magnetic film, and the magnetic film exposed by the ion beam milling and the second pole portion is mainly etched.

The specifications of U.S. Pat. No. 5,438,747 and U.S. Pat. No. 5,452,164 teach that the write gap film and the magnetic film are etched by the ion beam milling using, as a mask, the second pole portion obtained by the photolithography to form the first pole portion having the width equal to the width of the second pole portion. However, the etching process is so performed that the width of the first pole portion can become equal to the width of the second pole portion, so the specification does not teach to narrow the track widths of these pole portions.

BRIEF DESCRIPTION OF THE DRAWINGS

For a better understanding of this invention, reference is made to the attached drawings, wherein:

FIG. 3 is a cross sectional view showing the manufacturing step of the thin film magnetic head of FIGS. 1 and 2, FIG. 4 is a cross sectional view, taken on line "4—4" of FIG. 3, FIG. 5 is a plan view of the thin film magnetic head of FIG. 3, FIG. 6 is a cross sectional view showing the step after the step shown in FIG. 3, FIG. 7 is a cross sectional view, taken on line "7—7" of FIG. 6, FIG. 8 is a plan view of the thin film magnetic head of FIG. 6, FIG. 9 is a cross sectional view showing the step after the step shown in FIG. 6, FIG. 10 a cross sectional view, taken on line "10—10" of FIG. 9, FIG. 11 is a plan view the thin film magnetic head of FIG. 9, FIG. 12 is a cross sectional view showing the step after the step shown in FIG. 9, FIG. 13 is a cross sectional view, taken on line "13—13" of FIG. 12, FIG. 14 is a plan view of the thin film magnetic head of FIG. 12, FIG. 15 is a cross sectional view showing the step after the step shown in FIG. 12, FIG. 16 is a cross sectional view showing the pole structure obtained from the step shown in FIG. 15, FIG. 19 is a cross sectional view, taken on line "19—19" of FIG. 18, FIG. 20 is a perspective view in enlargement showing the pole portion of the thin film magnetic head of FIG. 18, FIG. 21 is a cross sectional view showing the manufacturing method of the thin film magnetic head shown in FIGS. 18 to 20, FIG. 22 is a cross sectional view, taken on line "22—22" of FIG. 21, FIG. 31 is a cross sectional view showing the step after the step shown in FIG. 29, FIG. 32 is a cross sectional view showing the pole structure obtained from the step shown in FIG. 31, FIG. 33 is a cross sectional view showing the step after the step shown in FIG. 31, FIG. 34 is a cross sectional view, taken on line "34—34" of FIG. 33.

DETAILED DESCRIPTION OF PREFERRED EMBODIMENTS

Figure 1:
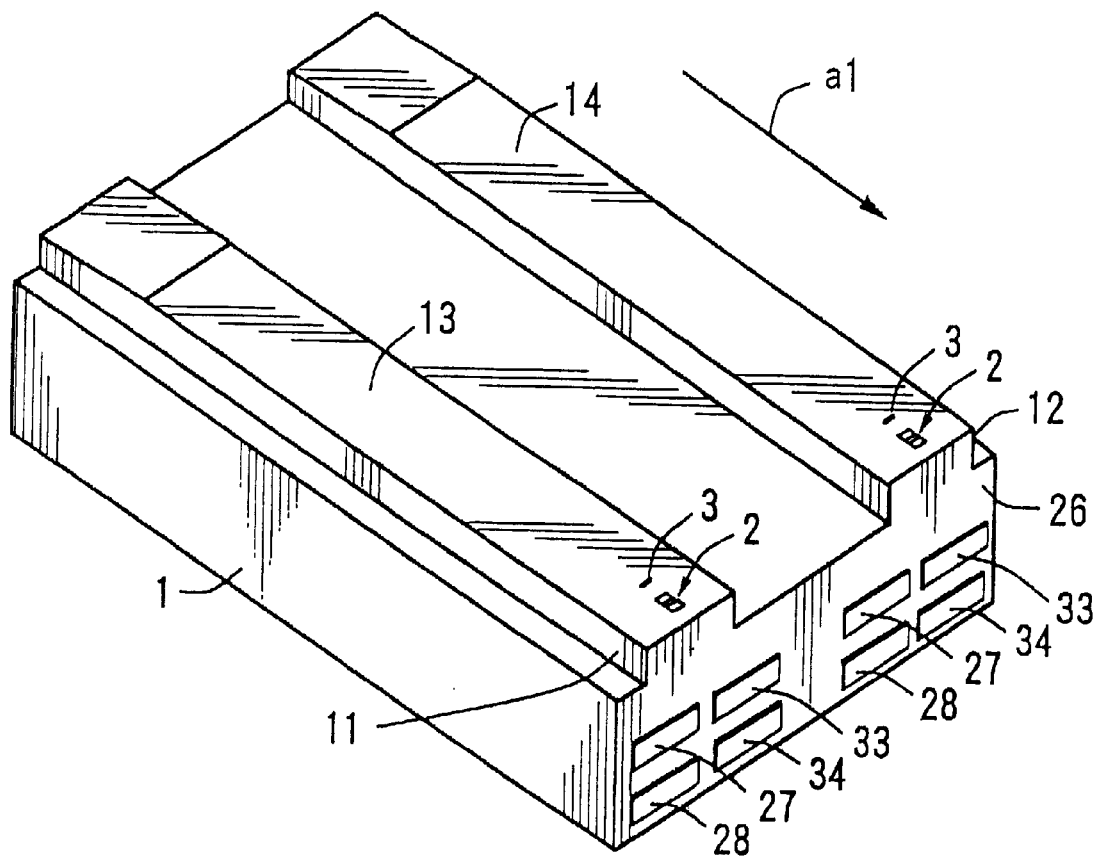
FIG. 1 is a perspective view showing an embodiment of the thin film magnetic head according to the manufacturing method of the present invention.
Figure 2:
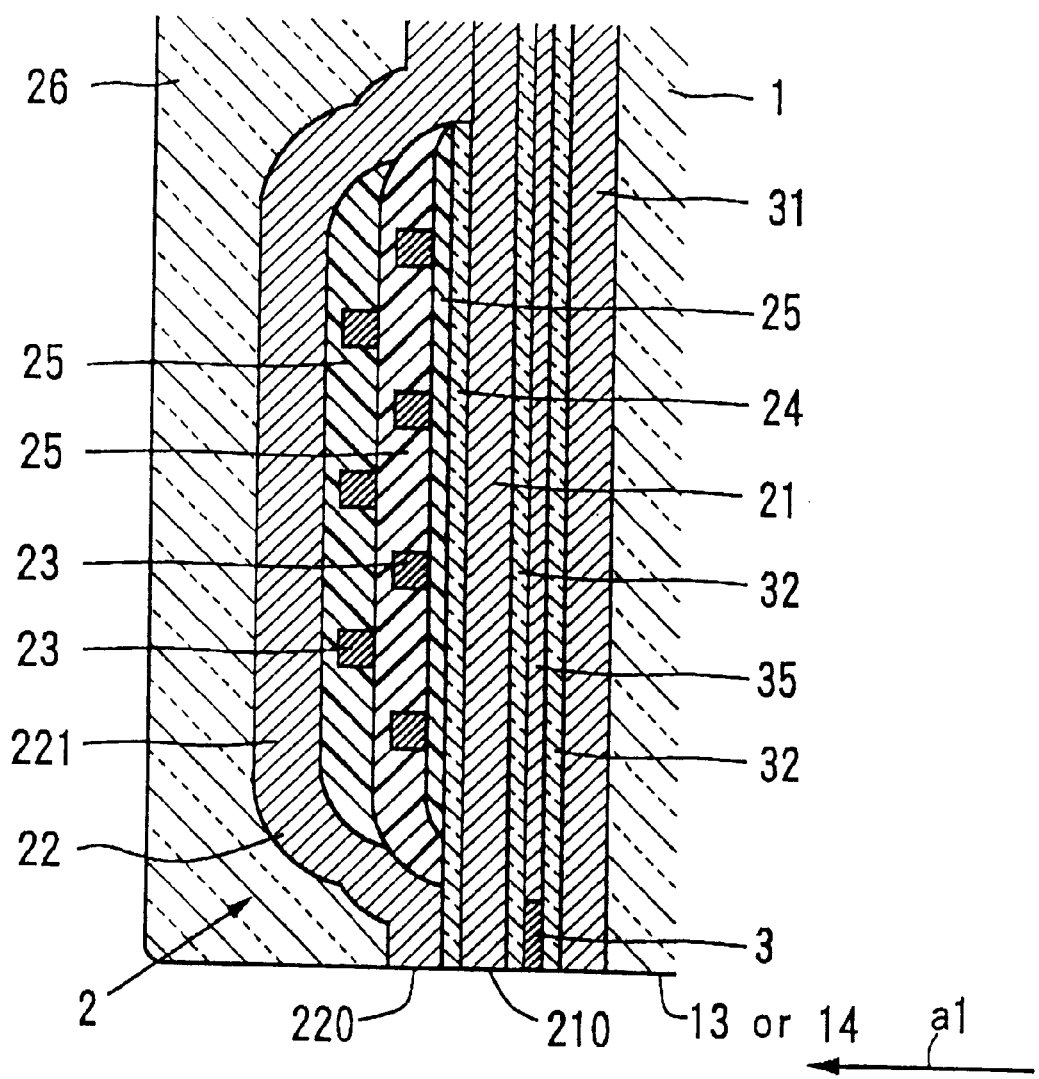
FIG. 2 is a cross sectional view of the thin film magnetic head of FIG. 1, cut away alongside the perpendicular face to its ABS.

FIG. 1 is a perspective view showing an embodiment of the thin film magnetic head according to the manufacturing method of the present invention, and FIG. 2 is a cross sectional view of the thin film magnetic head of FIG. 1, cut away alongside the perpendicular face to its ABS. In these figures, the dimension of each part of the thin film magnetic head is different from that in the practical one. First of all, reference to FIG. 1, a thin film magnetic head illustrated has a slider 1 and at least one inductive type thin film magnetic conversion element 2. The slider 1 has rail parts 11 and 12, of which the surfaces are used for ABSs 13 and 14, on the surface opposing to a magnetic recording medium. The number of the rail parts 11 and 12 is not limited to two. The slider may have one to three rail parts, or no rail part. Moreover, for improving a floating characteristic or the like, the face of the slider 1 opposite to a recording medium may have various geometrical shapes. The present invention may be applied to every type of the above configuration. The slider 1 is made of ceramic material such as AlTiC.

The thin film magnetic conversion element 2, provided on the slider 1, has a first magnetic thin film 21, a write gap film 24, a second magnetic thin film 22, thin film coil 23, a coil insulating film 25 and a protective film 26. The first magnetic film 21 has a first pole portion 210. The thin film coil 23 is supported with the coil insulated layer 25. The first magnetic layer 21, the write gap film 24, the second magnetic film 22, the thin film coil 23, the coil insulating film 25 and the protective film 26 are formed, of the materials well known to them, in thicknesses and patterns well known to the ordinary person skilled in the art, respectively. Moreover, they may be made by an ordinary means. The concrete examples in the above films are described as follows:

The first magnetic film 21 is formed, of a soft magnetic material such as NiFe, CoFe, CoFeNi, in a thickness of 0.5–4 μm. The film may be formed by a plating method, a sputtering method or the like.

The second magnetic film 22 is formed, of a soft magnetic material such as NiFe, CoFe, CoFeNi, in a thickness of 3–5 μm. The film may be formed by a frame plating method. Besides, for narrowing its track width, dry-etching may be used. The detail description about the forming method will be concretely explained in a manufacturing method according to the present invention.

The thin film coil 23 are formed of a conductive material such as Cu, etc. The thickness of the thin film coil is preferably 2–5 μm. The thin film coil 23 is preferably formed by a frame-plating method or the like.

The write gap film 24 may be formed of a non-magnetic insulated material such as $Al_2O_3$, $SiO_2$ or a non-magnetic metallic material. In the case of forming the write gap film of the non-magnetic insulated material, a sputtering method is preferably used. In the case of forming the non-magnetic metallic material, a plating method or a sputtering method may be used. Its thickness is preferably 0.01–0.5 μm.

The insulating films 25 is preferably formed by curing a photoresist material. The layer-number and the thickness of the coil insulating film 25 change depending on the layer-number of the thin film coil 23 and the supporting structure of the thin film coil. Generally, its thickness is 3–20 μm.

The protective film 26 may be formed of an insulated material such as $Al_2O_3$, $SiO_2$, etc. Its thickness is preferably 5–50 μm. The film may be formed by a sputtering method or the like.

The thin film coil 23 constitutes a thin film magnetic circuit as well as the first magnetic film 21, the second magnetic film 22 and the write gap film 24. The thin film coil 23 is supported by the coil insulating film 25 and is so formed that it can wind around the connection of the yoke part. Both ends of the thin film coil 23 is conducted to takeout electrodes 27 and 28 (see, FIG. 1). The winding number and the layer-number of the thin film coil 23 is not restricted. In this embodiment, the thin film coil 23 has a two-layered structure.

In the thin film magnetic head illustrated, the slider 1 has the ABSs 13 and 14 in the opposite side to a medium and the thin film magnetic conversion element 2 is provided on the slider 1, so that the thin film magnetic head may be used as a floating type thin film magnetic head which is employed with a magnetic recording medium such as a magnetic disk.

The yoke part 221 of the second magnetic film 22, of which the backside is magnetically connected to the first magnetic film 21, can make flow the magnetic flux generated from the writing current in the thin film coil 23 between the first and the second pole portions 210 and 220, effectively.

The thin film magnetic head shown in FIGS. 1 and 2 is a composite type which has the writing thin film magnetic conversion element 2 and a reading MR element 3 for reading. These thin film magnetic conversion elements 2 and 3 are provided in the ends of the rail parts 11 and 12 in a recording medium-moving direction a1, respectively. The recording medium-moving direction a1 corresponds to an outflow direction of an air when the recording medium moves at high speed.

As the MR element 3, various layered structures are suggested and practically used up to now. The MR element 3 may be composed of an anisotropically magnetoresistive effective element made of permalloy, etc, a giant magnetoresistive (GMR) effective film and the like. Moreover, it may be so composed that it may use a tunnel connection-magnetoresistive (TMR) effect. However, the MR element in the present invention may be composed of every kind of layered structure as above-mentioned. The MR element 3 is positioned in the insulating film 32 between a first shielding film 31 and the first magnetic film 21 doubling as a second shielding film. The insulating film 32 is made of alumina, etc. The MR element 3 is connected to the electrodes 33 and 34 (see, FIG. 1) with a leading conduction 35 (see, FIG. 2).

A manufacturing method according to the present invention of the thin film magnetic head shown in FIGS. 1 and 2 will be explained hereinafter. FIGS. 3 to 11 are the views showing the steps included in the manufacturing method according to the present invention. The similar parts in FIGS. 3 to 11 to ones in FIGS. 1 and 2 are depicted by the same references. Although in the real manufacturing method of the thin film magnetic head, many thin film magnetic heads are formed on a wafer at the same time, in the above figures, only one thin film magnetic head is represented on a wafer.

First of all, the manufacturing method according to the present invention will be described with reference to FIGS. 3 to 5. FIG. 3 is a cross sectional view elevationally showing the magnetic conversion element part of the thin film magnetic head in a step, FIG. 4 a cross sectional view, taken on line "4—4" of FIG. 3, and FIG. 5 a plan view of the magnetic conversion element shown in FIG. 3. In FIGS. 3 to 5, for clarifying these figures, the dimension of each part of the thin film magnetic head is different from that in the practical one.

In FIGS. 3 to 5, the first magnetic film 21, the write gap film 24 and the coil insulating film 25 to support the thin film coil 23 have been already formed on the substrate 1 to be the slider. Not shown in the figures, a plated underfilm (a seed film) to form the second magnetic film by a plating method is formed. These components may be formed by a well known process to an ordinary person skilled in the art and are not substantial parts in the present invention. Thus, they will be explained briefly.

First of all, on one surface of a base substance made of AlTiC is formed an insulating film made of alumina having a thickness of about 3–5 µm to form the slider 1, that is, the substrate. On the insulating film on the base substance is formed, depending on a given pattern, a first shield layer 31 having a thickness of about 3 µm made of permalloy for a magnetoresistive effective type thin film magnetic head, by a plating method with a photoresist as a mask. Subsequently, on an insulating film 32 having a thickness of 0.2 µm made of alumina are formed a MR element 3 and a leading conductor 35 in a given pattern, on which an insulating film 32 made of alumina is formed. Then, on the insulating film 32 are formed in a thickness of 3–4 µm, made of permalloy, the first magnetic film 21 constituting a top shield for the MR element 3 and a bottom pole of the inductive type thin film magnetic head, on which the two-layered thin film coil 23, insulated by the coil insulating film 25, is formed. The thin film coil 23 may be formed in a give pattern by a copper-electroplating. The coil insulating film 25 may be formed of photoresist and is annealed at a temperature of 200–250° C. after each of the two-layered thin film coil is formed.

As shown in FIG. 3, a photoresist 6 is applied on the insulating film 25. The photoresist 6 may be formed by a spin-coating method. A photolithography process required to form the second magnetic film is performed with a photomask PHM being put on the photoresist 6.

In FIGS. 6 to 8, a resist frame 60, formed by the photolithography process, is depicted. The resist frame 60 has an opening 61 with the pattern corresponding to the pattern of the second magnetic film to be formed.

Next, as shown in FIGS. 9 to 11, the second magnetic film 22 is formed in the opening 61 of the resist frame 60 by an electroplating method or the like. The second magnetic film 22 is stuck on the external area of the resist frame, but the plated film stuck on the external area is removed by a dry-etching method such as milling. These figures show the state after the dry-etching. The second magnetic film 22 constitutes the write gap film 24 and a second pole portion 220 parallel to the first magnetic film 21 within the position of a throat height TH "0" from the ABS, and is inclined at an apex angle of θ toward the upper surface of the coil insulating film 25 from the position of the throat height TH "0".

The track width W20 of the second pole portion 220 is set to a highly precise dimension and shape almost defined by the pattern of the opening 61 of the resist frame 60. In the past, the thus defined track width W20 is used as a track width of a final product. Thus, it is very difficult to obtain the track width w20 of not more than 1 µm, particular not more than 0.8 µm. In the present invention, the following steps will be performed for much narrowing the track width.

Figure 17:
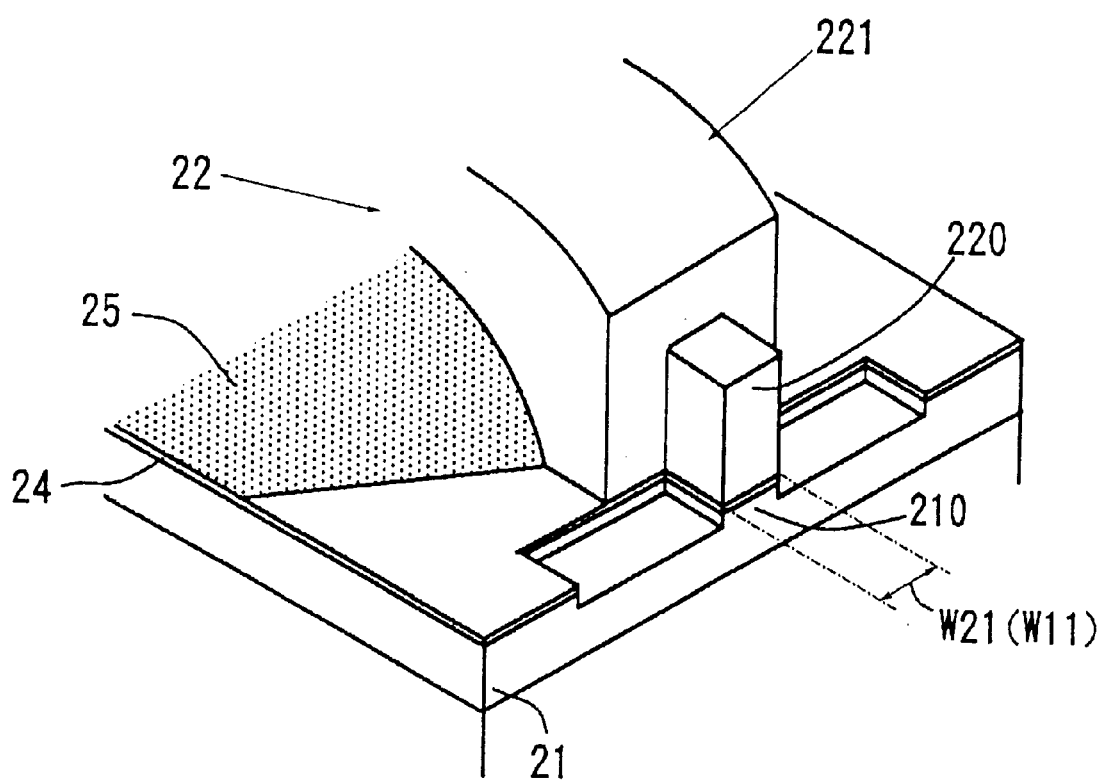
FIG. 17 is a perspective view in enlargement showing the pole portion of the thin film magnetic head obtained from the steps shown in FIGS. 3 to 15.

First of all, after the resist frame 60 is removed as shown in FIGS. 12 to 14, the second pole portion 220 is dry-etched as shown in FIG. 15. Thereby, as shown in FIGS. 16 and 17, a narrowed track width W21 is obtained. In FIGS. 16 and 17, the second pole portion 220 is opposed to the first pole portion 210 via the write gap film 24.

According to the above manufacturing method, a track width of a writing pole can be narrowed, by the dry-etching, to the much narrowed width W21 from the track width defined by the photolithography. The track width W21 of not more than 1 µm, which can be hardly obtained by the photolithography, can be easily realized. Concretely, the track width W21 of not more than 0.5 µm, which can not be obtained in the past, can be realized.

Furthermore, in the case of defining the track width W20 with the mask patterned by the photolithography process (see, FIGS. 3 to 14), the track width W20 may be larger than the track width W21 to be finally obtained. Thus, the photolithography process enables the ratio of the height and the frame space to define the track width W20 of the resist frame 60 (aspect ratio) to be decreased. Thereby, the second magnetic film 22 is smoothly plateformed and the magnetic characteristics of the second pole portion 220 is stabilized to inhibit the degradation of the recording performance.

The dry-etching is firstly carried out to the track width W20 of 1.5–2.5 µm, for example, obtained by the photolithography to form the track width W21 of not more than 1 µm finally. Such a dry-etching process enables the effects according to the present invention as above-mentioned to be obtained absolutely.

The dry-etching process is preferably an ion beam milling process using Ar ion. The ion beam milling etches the first pole portion 210 composed of the write gap film 24 and the first magnetic film 21 as shown in FIGS. 16 and 17. Since the first pole portion 210 is so reduced that it can have the width W11 almost equal to the track width W21 of the second pole portion 220, the preferable pole structure to prevent a side fringe can be obtained.

In the above ion beam milling process, at least two ion incident angles θ1 and θ2, being different each other, are preferably selected at a different timing, respectively. The ion incident angles θ1 and θ2 are the values to the normal line as a standard value (0 degree) to the film constituting the first pole portion 210. In this case, the ion incident angle (a first ion incident angle) θ1 is selected with regard to the reduction of the write gap film 24 and the first pole portion 210, and the ion incident angle (a second ion incident angle) θ2 is selected to narrow appropriately the track width by reducing the both side walls of the second pole portion 220. It enables the track width W21 of the second pole portion 220 to be defined and the write gap film 24 and the first pole portion 210 to be reduced corresponding to the track width W21, effectively.

The ion beam milling process using the first ion incident angle θ1 and the second ion incident angle θ2 is preferably repeated twice and more. Thereby, the both sides of the second pole portion 220, the write gap film 24 and the first pole portion 210 can be stepwise reduced by their small reduction amounts, respectively. Thus, it is very effective for forming the track widths W21 and W11 high precisely.

In the ion beam milling process, the ion incident angles θ1, θ2 and their incident time are most appropriately selected, depending on a material to be etched and its thickness. In a normal thin film magnetic head, the first ion incident angle θ1 is preferably selected to 25–55 degrees when the normal line to the film constituting the first pole portion 210 is chosen as a standard value "0 degree", and the second ion incident angle θ2 is preferably selected to 60–80 degrees.

The first ion incident angle θ1 of 25–55 degrees can reduce the first pole portion 210 intensively, inhibiting the reduction of the surface of the second pole portion 220.

If the first ion incident angle θ1 is smaller than 25 degrees, the surface of the second pole portion 220 is intensively reduced, resulting in the film-reduction of the second pole portion 220 and intensive reduction of the write gap film 24 and the first pole portion 210. It causes problems such as the re-sticking of the particles generated from the above reduction on the sides of the second pole portion 220. If the first ion incident angle θ1 is larger than 55 degrees, the reduction speed of the first pole portion 210 is decreased.

The second ion incident angle θ2 of 60–80 degrees can reduce the sides of the first pole portion 210 and the second pole portion 220, effectively. If the second ion incident angle θ2 is smaller than 60 degrees, the lateral reduction (the reduction in a direction perpendicular to the film constituting the pole portions) speed of the first and second pole portions 210 and 220 is decreased. If the second ion incident angle θ2 is larger than 80 degrees, the lateral reduction speed is remarkably increased.

As an optimum example, the first ion incident angle θ1 is selected to 45 degrees and its incident time is selected to 18 minutes (total time). Then, the second ion incident angle θ2 is selected to 70 degrees and its incident time is selected to five minutes (total time).

The etching process using the above two-step ion beam milling is concretely carried out by the following steps.
(1) First of all, the etching process is carried out at the first ion incident angle θ1 of 45 degrees and the its irradiation time of nine minutes.
(2) Then, the etching process is carried out at the second ion incident angle θ1 of 70 degrees and its irradiation time of three minutes.
(3) Thereafter, the etching is carried out at the first ion incident angle θ1 of 45 degrees and its irradiation time of nine minutes.
(4) Lastly, the etching is carried out at the second ion incident angle θ2 of 70 degrees and its irradiation time of two minutes.

The above etching is carried out with a wafer in which the thin film magnetic head is to be formed is rotated around the perpendicular axis to its surface. Thereby, the dry-etching can be carried out to the both sides of the second pole portions 220 of all the thin film magnetic heads formed on the wafer.

In this embodiment, the etching process is performed by the ion beam milling, but may be done by a reactive ion etching (RIE). Particularly, it is preferable that the first and the second pole portion are etched by the ion beam milling and the write gap film 24 is removed by the reactive ion etching.

Figure 18:
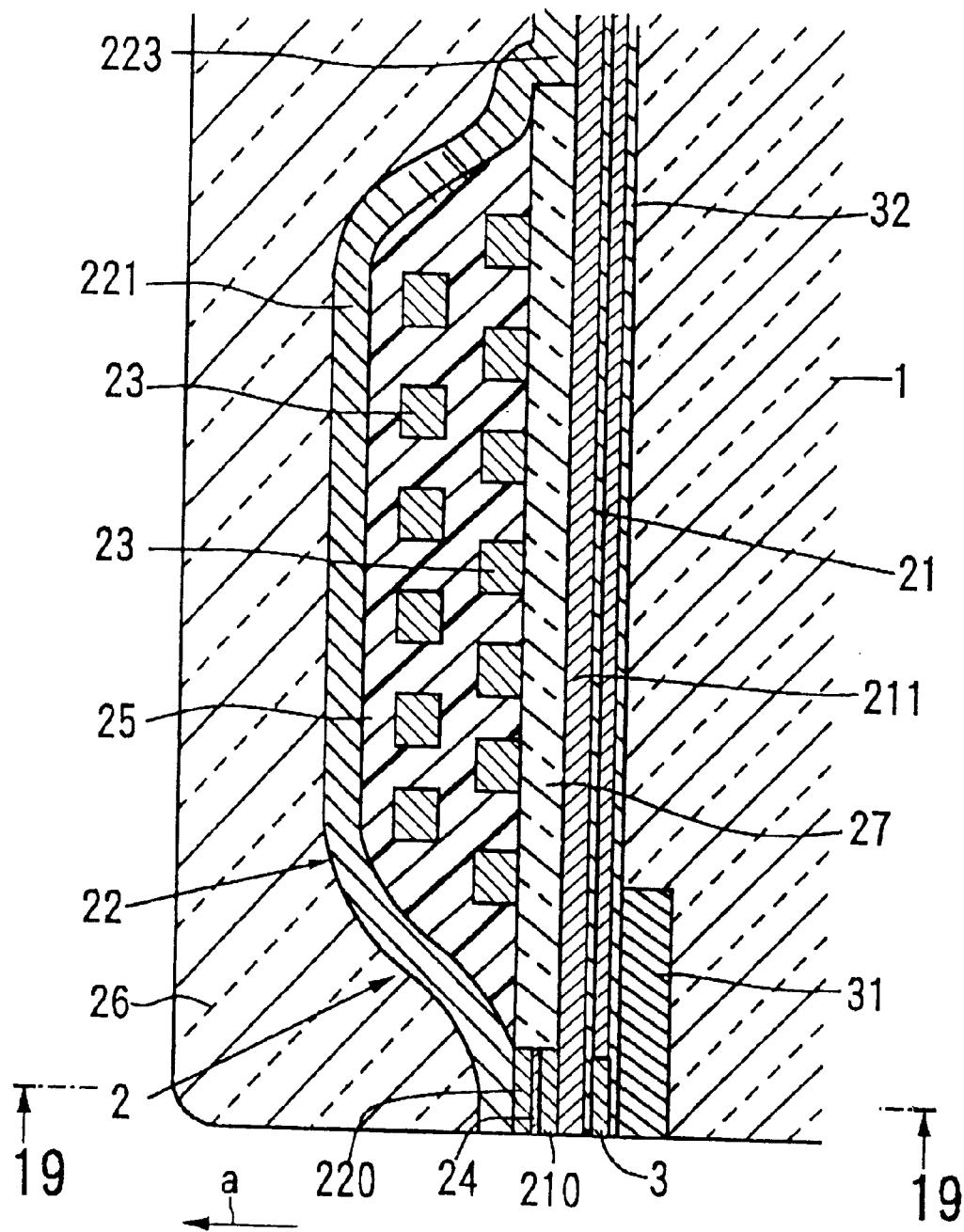
FIG. 18 is a cross sectional view showing another embodiment of the thin film magnetic head according to the manufacturing method of the present invention.

FIG. 18 is a cross sectional view showing another embodiment of the thin film magnetic head formed by the manufacturing method according to the present invention, FIG. 19 a cross sectional view, taken on line "19—19" of FIG. 18 and FIG. 20 a perspective view in enlargement showing the writing pole portion of the thin film magnetic head of FIG. 18. The similar parts in these figures to ones in FIGS. 1 and 2 are depicted by the same references.

A writing element 2 is an inductive type thin film magnetic conversion head, laminated on a MR reading element 3. A first magnetic film 21 constituting the writing element 2 has a first yoke part 211 and the first pole portion 210, and the first pole portion 210 is stuck on the first yoke part 211, protruding thereon.

A second magnetic film 22 has a second pole portion 220 and a second yoke part 221. The second pole portion 220 is stuck on a write gap film 24 formed on the first pole portion 210 and has the track width W21 substantially equal to the track width W11 of the first pole portion 210.

The first pole portion 210, the second pole portion 220 and the write gap film 24 are surrounded by a non-magnetic insulating film 27 so as to be embedded thereby. The upper surface of the non-magnetic insulating film 27 is flattened and has substantially the same level as the surface of the second pole portion 220. The non-magnetic insulating film 27 is made of $Al_2O_3$, $SiO_2$, etc. The reference "26" designates a protective film, made of $Al_2O_3$, $SiO_2$, etc, covering the writing element 2 entirely.

A second yoke part 221, having the forefront with the track width W22 larger than the track width W21 of the second pole portion 220, is laminated on the second pole portion 220. Moreover, the both ends of the second yoke part 220 in the track width direction are stuck to the upper surface of the non-magnetic insulating film 27. An insulating film 25 to support a thin film coil 23 is formed on the upper surface of the non-magnetic insulating film 27.

The yoke parts 211 and 221 of the first and second magnetic films 21 and 22 are connected so as to form a magnetic circuit in a backward connection part 223 opposite to the first and the second pole portions 210 and 220. The thin film coil 23 is formed so as to wind the connection part 223 spirally. The winding number and the layer number of the thin film coil 23 are not restricted.

As above-mentioned, the second pole portion 220 of the writing element 2 is opposed to the first pole portion 210 via the write gap film 24 and has the track width W21 almost equal to the track width W11 of the first pole portion 210. Thus, a side fringe magnetic field is prevented from occurring and the track density can be developed to achieve a high density recording.

Since the part of the second yoke part 221 stuck on the second pole portion 220 has the track width W22 larger than the track width W21 of the second pole portion 220, a magnetic flux does not saturates and the writing performance is not undermined even if the track width W21 of the second pole portion 220 is narrowed.

Moreover, since the second yoke part 221 is laminated on the second pole portion 220, not formed at the same time as the forming the second pole portion 220, the second yoke part 221 may be formed after the second pole portion 220 is formed so as to have the same track width as that of the first pole portion 210 and the write gap 24(W21=W11). This structure will bring about many advantages in the manufacturing process as is explained, hereinafter.

The first pole portion 210, the second pole portion 220 and the write gap film 24 are surrounded by the non-magnetic insulating film 27 so as to be embedded thereby. The upper surface of the non-magnetic insulating film 27 is flattened and has the same level as the surface of the second pole portion 220. One of the advantages in such a structure is that the second yoke part 221 can be directly formed on the surface of the second pole portion 220 without forming a depressed portion, etc. on the upper surface of the non-magnetic insulating film 27. Thus, even if the track width of the second pole portion 220 is narrowed, the second yoke part can be certainly and easily stuck on the second pole portion. Moreover, since the forefront of the second yoke part 221 has the track width W22 larger than the track width W21 of the second pole portion 220, as above-mentioned, the writing performance is not undermined. Moreover, since the both ends of the second yoke part 221 in the track width direction is stuck to the upper surface of the non-magnetic insulating film 27, even if the track width W21 of the second pole portion 220 is narrowed, the sufficient sticking area and sticking strength thereof can be obtained.

The other advantage is that the flatness of the non-magnetic insulating film 27 enables a flat base substance to form the thin film coil 23 to be obtained. That is, the thin film coil 23 and the supporting insulating film 25 can be formed. Thus, since the thin film coil forming process is carried out on the flat surface of the non-magnetic insulating film 27, the disconnection and short-circuit of the thin film coil 23, etc., being likely to occur in forming the coil in the area having steps, can be prevented.

The writing element 2 is formed on the MR reading element 3. In this case, the first yoke part 211 of the writing element 2 doubles as a second shield film to the MR reading element 3. Since the first pole portion 210 is formed on the first yoke part 211, protruding thereon, the track width W11 of the first pole portion 210 can be narrowed while the width of the second shield film composed of the first yoke part 211 is maintained in the dimension required to protect the MR reading element 3.

Next, with reference to FIGS. 21 to 38, an embodiment of the manufacturing method of the thin film magnetic head shown in FIGS. 18 to 20 will be described.

FIG. 21 is a cross sectional view showing the state in which the MR reading element 3 is formed on the substrate 1 and FIG. 22 is a enlarged cross sectional view, taken on line "22—22" of FIG. 21. In the steps shown in FIGS. 21 and 22, a second shield film 211 constituting the MR reading element 3 is formed on a surface of an inorganic insulating film 32.

Figure 23:
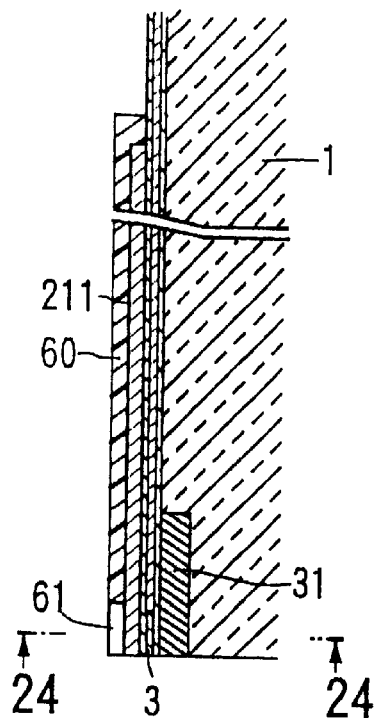
FIG. 23 is a cross sectional view showing the step after the step shown in FIG. 21.
Figure 24:
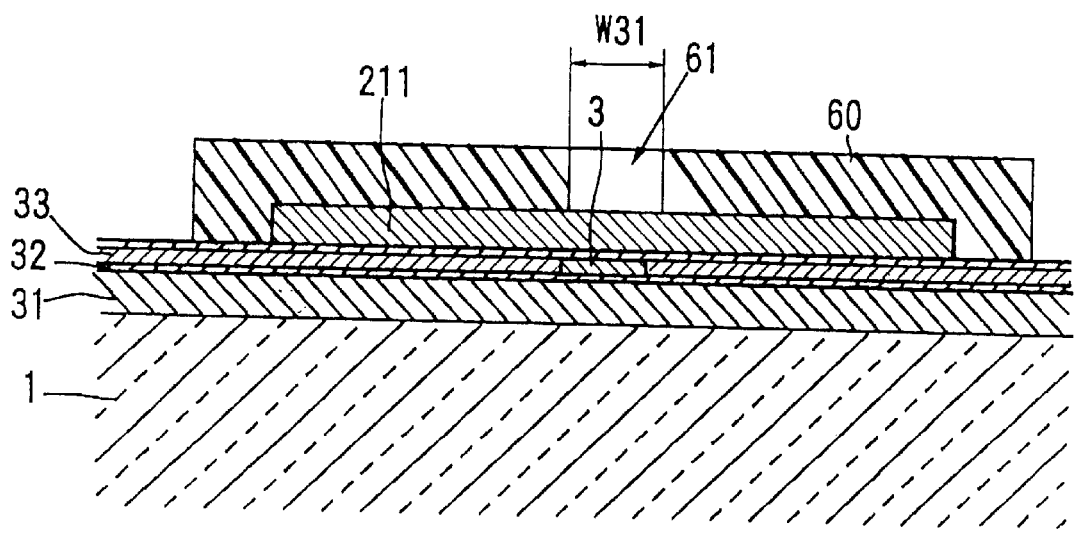
FIG. 24 is a cross sectional view, taken on line "24—24" of FIG. 23.

Subsequently, as shown in FIGS. 23 and 24, a resist frame 60 is formed on the second shield film 211. The resist frame 60, formed by a photolithography process, has an opening 61 with the pattern corresponding to that of the writing pole portion. The width of the opening 61 defines the track widths W10 and W20 of the writing pole portion.

Figure 25:
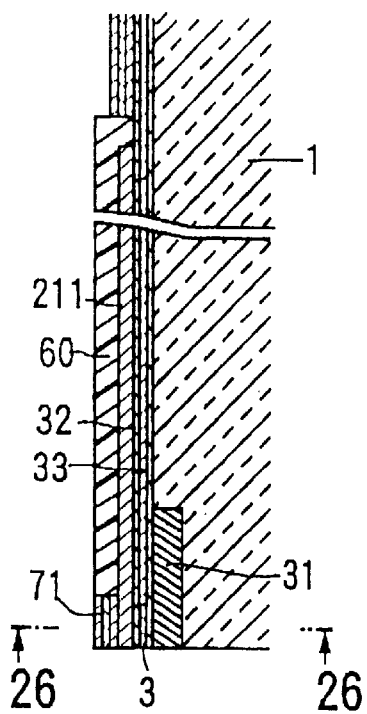
FIG. 25 is a cross sectional view showing the step after the step shown in FIG. 23.
Figure 26:
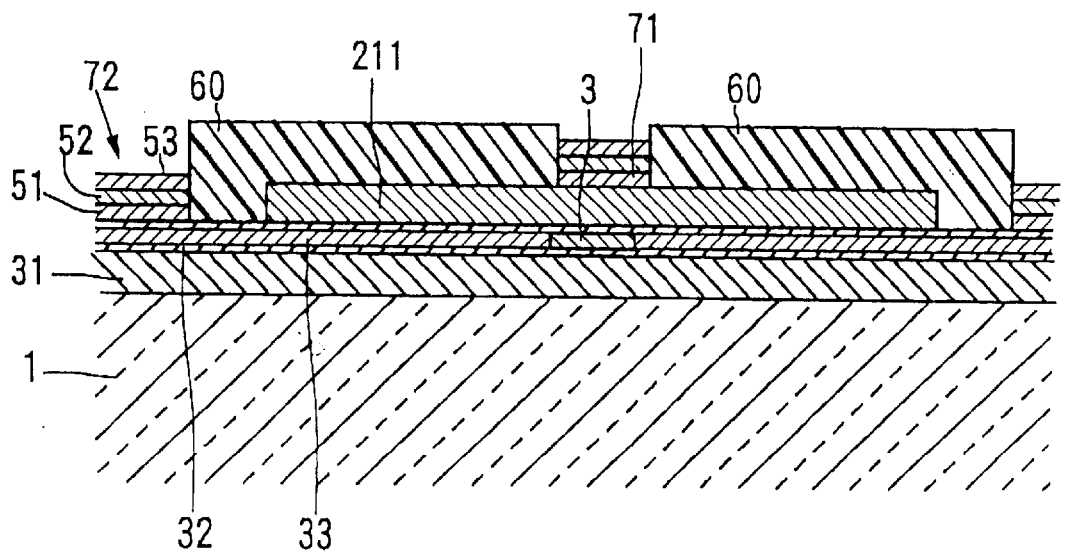
FIG. 26 is a cross sectional view, taken on line "26—26" of FIG. 25.

Next, as shown in FIGS. 25 and 26, in the opening 61 of the resist frame 60 is formed a laminated film 71 composed of a first magnetic film 51, a non-magnetic film 52 and a second magnetic film 53. At the same time, a laminated film 72 is formed in the external area of the resist frame 60. They may be formed by a frame plating method.

Figure 27:
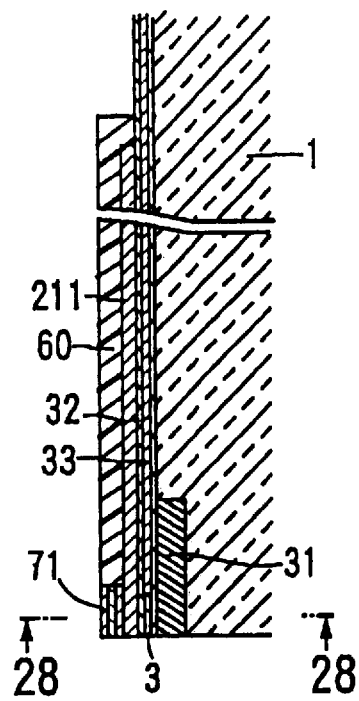
FIG. 27 is a cross sectional view showing the step after the step shown in FIG. 25.
Figure 28:
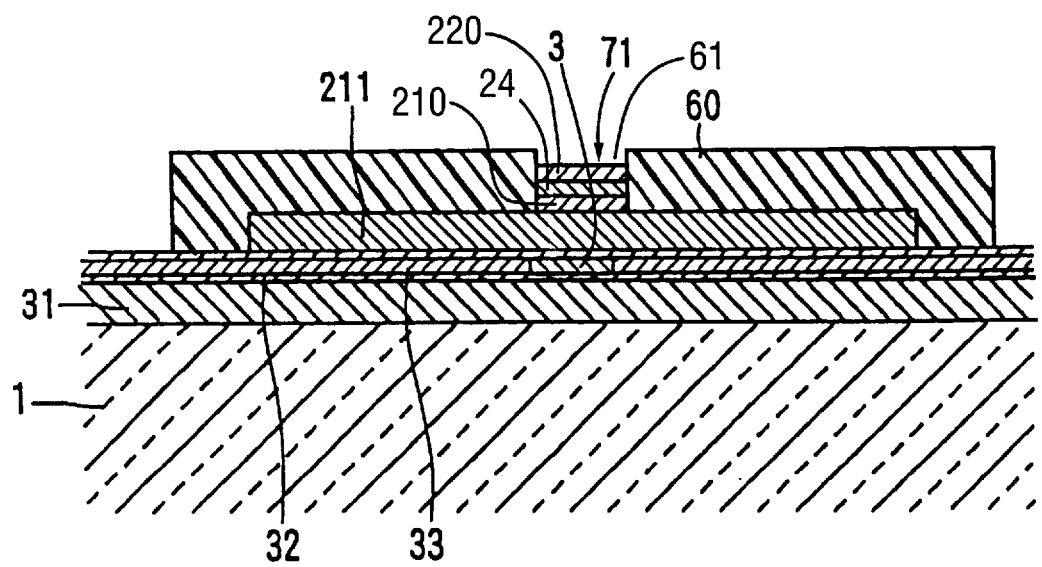
FIG. 28 is a cross sectional view, taken on line "28—28" of FIG. 27.

Then, as shown in FIGS. 27 and 28, the laminated film 72 is removed while the laminated film 71 formed in the opening 61 remains. Of the laminated film 71 in the opening 61, the first magnetic film 51 stuck on the second shield film 211 constitutes the first pole portion 210, the non-magnetic film 52 laminated on the first magnetic film constituting the write gap film, the second magnetic film 53 laminated on the non-magnetic film constituting the second pole portion 220. Since the resist frame 60 can be formed in the low step-stage of the stacking process, the track widths of the first and the second pole portions 210 and 220 can be easily and precisely set to minimum values determined by a photolithography process.

Moreover, since the first pole portion 210, the write gap film 24 and the second pole portion 220 are defined by the opening 61 of the resist frame 60 at the same time, they can be easily aligned high precisely.

Figure 29:
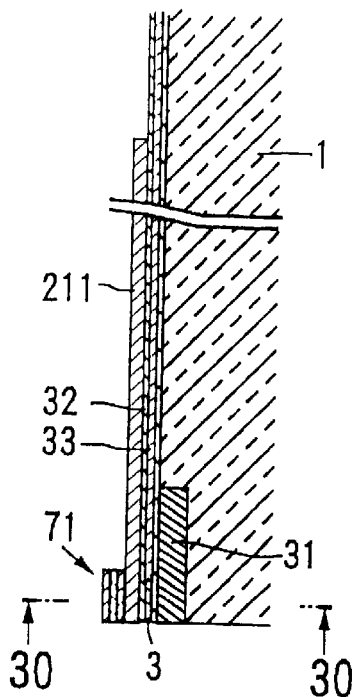
FIG. 29 is a cross sectional view showing the step after the step shown in FIG. 27.
Figure 30:
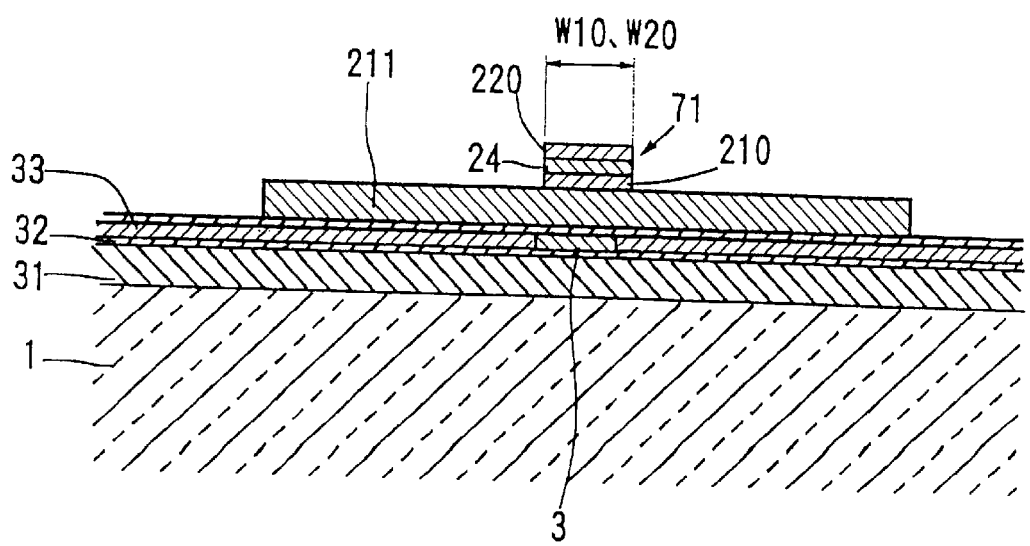
FIG. 30 is a cross sectional view, taken on line "30—30" of FIG. 29.

Subsequently, as shown in FIGS. 29 and 30, the resist frame 60 is removed. The resist frame 60 may be removed by an organic solvent or a resist remover.

Hereupon, the track width W10 and W20 of the first pole portion 210 and the second pole portion 220 are set to the dimensions and shapes almost determined by the pattern of the opening 61 of the resist frame 60. In the past, the defined track widths W10 and W20 would be used as a track width in a final product. In the present invention, the following treatment will be performed for much narrowing the track width.

First of all, as shown in FIG. 31, the laminated film 71 is dry-etched. Thereby, as shown in FIG. 32, the narrowed track width W21 can be obtained.

According to the above method, the track width of the writing pole can be decreased to the much narrowed widths W11 and W21 from the track widths W10 and W20 determined by the photolithography by the reduction using the dry-etching. In this way, the track widths W11 and W21 of not more than 1 $\mu$m, which have difficulty being formed by the photolithography, can be easily realized.

Moreover, in the case of defining the track widths W10 and W20 using a mask patterned by a photolithography process, they may have the larger widths than the finally obtained track widths W11 and W21. Consequently, in the photolithography process shown in FIGS. 23 to 30, the ratio (aspect ratio) of the height of the resist frame 60 and the frame space thereof to determine the track widths W10 and W20 can be decreased. Thereby, the laminated film 71 can be smoothly plate-formed and the magnetic characteristics of the first and the second pole portions 210 and 220 can be stabilized to prevent the degradation of the recording performance.

The dry-etching is firstly carried out to the track widths W10, W20 of 1.5–2.5 $\mu$m, for example, obtained by the photolithography to form the track widths W11, W21 of not more than 1 $\mu$m finally. Such a dry-etching process enables the effects according to the present invention as above-mentioned to be obtained absolutely.

The dry-etching process shown in FIG. 31 is preferably an ion beam milling process using Ar ion. In the above ion beam milling process, at least two ion incident angles $\theta 1$ and $\theta 2$, being different each other, are preferably selected at a different timing, respectively. For example, the ion beam milling is performed at a second ion incident angle $\theta 2$ in succession to a first ion incident angle $\theta 1$. The first ion incident angle $\theta 1$ is selected to a value mainly suitable for reducing the first yoke part 211 constituting the yoke parts, and the second ion incident angle $\theta 2$ to a value mainly suitable for reducing the track width through the reducing the both sides of the laminated film 71 composed of the first pole portion 210, the write gap film 24 and the second pole portion 220. Thus, the defining the track width of the laminated film 71 and the reducing the first yoke part 211 corresponding to the track width can be effectively performed.

The ion beam milling process using the first ion incident angle $\theta 1$ and the second ion incident angle $\theta 2$ is preferably repeated several times, for example, twice as above mentioned. Thereby, the both sides of the laminated film 71 and the first yoke part 211 can be stepwise reduced by their small reduction amounts, respectively. Thus, it is very effective for forming the track widths high precisely.

In the ion beam milling process, the ion incident angles $\theta 1$, $\theta 2$ and their incident time are most appropriately selected, depending on a material to be etched and its thickness. In a normal thin film magnetic head, the first ion incident angle θ1 is preferably selected to 25–55 degrees when the normal line to the film constituting the first yoke part 210 is chosen as a standard value "0 degree", and the second ion incident angle θ2 is preferably selected to 60–80 degrees.

The first ion incident angle θ1 of 25–55 degrees can reduce the first yoke part 211 intensively, inhibiting the reduction of the surface of the second pole portion 220 in the laminated film 71.

If the first ion incident angle θ1 is smaller than 25 degrees, the surface of the second pole portion 220 in the laminated film 71 is intensively reduced, resulting in the film-reduction of the second pole portion 220 and intensive reduction of the first yoke part 211. It causes problems such as the re-sticking of the particles generated from the above reduction on the sides of the laminated film 71. If the first ion incident angle θ1 is larger than 55 degrees, the reduction speed of the first yoke part 211 is decreased.

The second ion incident angle θ2 of 60–80 degrees can reduce the sides of the first yoke part 211 and the laminated film 71, effectively. If the second ion incident angle θ2 is smaller than 60 degrees, the lateral reduction (the reduction in a direction perpendicular to the film constituting the pole portions) speed of the first yoke part 211 and the laminated film 71 is decreased. If the second ion incident angle θ2 is larger than 80 degrees, the lateral reduction speed is remarkably increased.

As an optimum example, the first ion incident angle θ1 is selected to 45 degrees and its incident time is selected to 18 minutes (total time). Then, the second ion incident angle θ2 is selected to 70 degrees and its incident time is selected to five minutes (total time).

In this embodiment, since the laminated film 71 has the first pole portion 210, only the second ion incident angle θ2, suitable for reducing the both sides of the laminated film 71, may be selected.

The above etching is carried out with a wafer in which the thin film magnetic head is to be formed being rotated around the perpendicular axis to its surface. Thereby, the dry-etching can be uniformly carried out to the both sides of the laminated film 71 of all the thin film magnetic heads formed on the wafer.

Next, as shown in FIGS. 33 and 34, the non-magnetic insulating film 27 to cover the first yoke part 211 and the laminated film 71 is formed. The non-magnetic insulating film 27 may be formed by a sputtering method, etc.

Figure 35:
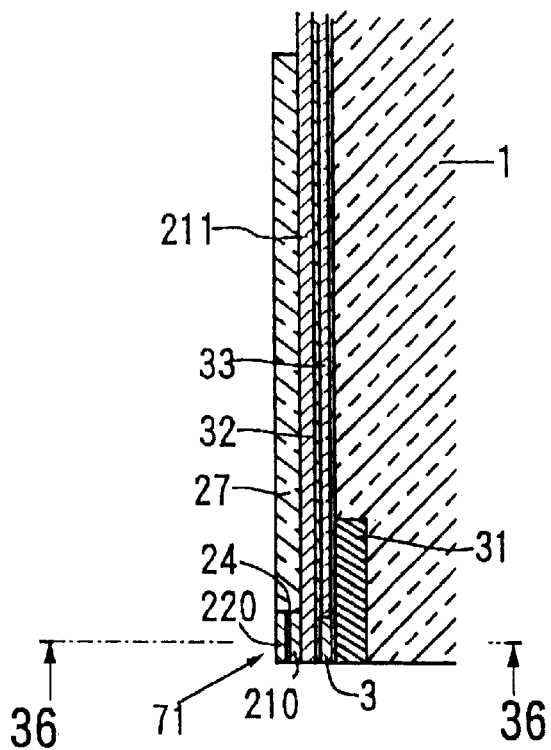
FIG. 35 is a cross sectional view showing the step after the step shown in FIG. 33.
Figure 36:
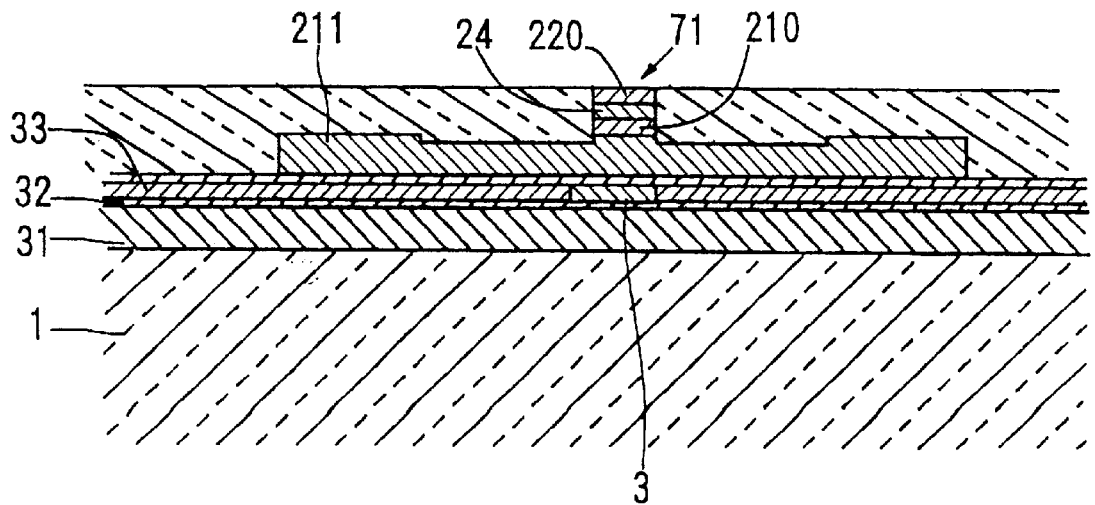
FIG. 36 is a cross sectional view, taken on line "36—36" of FIG. 35.

Subsequently, as shown in FIGS. 35 and 36, the surface of the non-magnetic insulating film 27 is flattened to expose the surface of the second pole portion 220 including to the laminated film 71. The flatness process may be carried out by a polishing method such as a CMP method, a ion beam milling method or the like.

Figure 37:
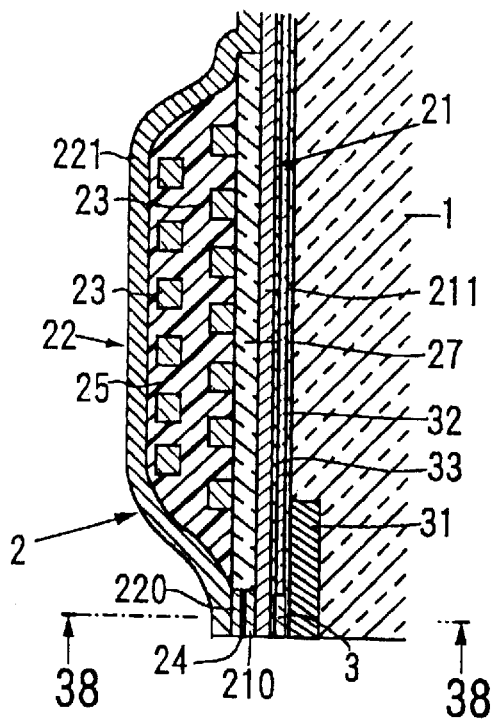
FIG. 37 is a cross sectional view showing the step after the step shown in FIG. 35.
Figure 38:
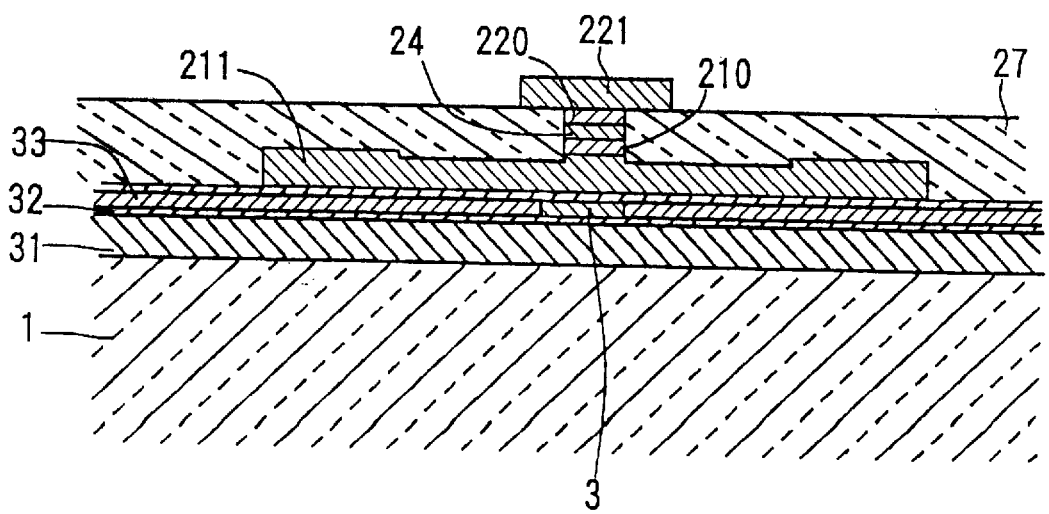
FIG. 38 is a cross sectional view, taken on line "38—38" of FIG. 37.

Next, as shown in FIGS. 37 and 38, after the thin film coil 23 and the supporting insulating film 25 of the coil are formed on the flat non-magnetic insulating film 27, the second yoke part 221 is formed. At this time, since the upper surface of the non-magnetic insulating film 27 is flattened and has substantially the same level as the surface of the second pole portion 220, the yoke part 221 can be directly connected to the surface of the second pole portion 220 without forming a depressed portion, etc. on the upper surface of the non-magnetic insulating film 27. Thus, even if the track width of the second pole portion 220 is narrowed, the second yoke part 221 can be certainly and easily stuck to the second pole portion 220.

The second yoke part 221 is so stuck that its forefront can have the track width W22 larger than the track width W21 of the second pole portion 220. According to such a structure, even if the track width of the second pole portion 220 is narrowed, the writing performance is not undermined. Moreover, since the both sides of the second yoke part 221 in the track width direction is stuck on the upper surface of the non-magnetic insulating film 27, even if the track width W21 thereof is narrowed, the sufficient sticking area and sticking strength of the second pole portion 220 can be obtained. Moreover, since in the stage of forming the second yoke part 221, the writing pole portion (210, 24, 220) have been already formed, the track width does not change in the forming process of the second yoke part 221.

Moreover, the flatness of the non-magnetic insulating film 27 can provide a flat base substance to form the thin film coil 23. That is, the thin film coil 23 and the supporting insulating film 25 can be formed the flat non-magnetic insulating film 27. Thus, since the forming process of the thin film coil can be performed on the flat non-magnetic insulating film 27, the disconnection and the short-circuit, etc. of the thin film coil, being likely to occur in forming the thin film coil 23 in the area having steps.

The present invention is explained in detail with reference to the concrete preferred embodiments, but it will be obvious to an ordinary person skilled in the art that its configuration and its details may be variously changed without departing from the spirit and the scope of the invention.

As above-mentioned, according to the present invention, the thin film magnetic head which can set the track width of the writing pole to a minute value precisely beyond the limit of a photolithography technique can be provided.

What is claimed is:

1. A method of manufacturing a thin film magnetic head with an inductive type thin film magnetic head having a first magnetic member including a first pole portion and a first yoke part, a second magnetic member including a second pole portion constituting an air bearing surface opposing to the first pole portion via a write gap film and to a magnetic recording medium as well as the first pole portion and a second yoke part magnetically connected to the first yoke in the position apart from the air bearing surface, a thin film coil including the part surrounded by the first and second magnetic members, and a substrate to support the first and second magnetic members and the thin film coil, comprising steps of:

forming a magnetic film to constitute at least the first yoke part of the first magnetic member so as to be supported by the substrate, forming at least the second pole portion of the second magnetic member, on the write gap film, in a desired pattern by a photolithography method after the write gap film is formed on the magnetic film, and subsequently dry-etching at least the second pole portion to reduce its width relative to its width after patterning.

2. A method of manufacturing a thin film magnetic head as defined in claim 1, wherein in the dry-etching step of at least the second pole portion, the write gap film and the first pole portion also are etched, thereby to narrow their widths.

3. A method of manufacturing a thin film magnetic head as defined in claim 2, wherein the dry-etching step of at least the second pole portion, the write gap film and the first pole portion as well as the second pole portion are etched to uniform the widths of the first pole portion, the second pole portion and the write gap film.

4. A method of manufacturing a thin film magnetic head as defined in claim 3, wherein in the forming step of the magnetic film constituting the first magnetic member, the magnetic film is so formed that it can constitute the first yoke part and the first pole portion, and in the dry-etching step of the second pole portion, the write gap film is removed by using, as a mask, the second pole portion to expose the part of the magnetic film under the removed write gap film, the exposed magnetic film being partially etched to form the first pole portion.

5. A method of manufacturing a thin film magnetic head as defined in claim 4, where the second pole portion is formed of a second magnetic film integrated with the second yoke part.

6. A method of manufacturing a thin film magnetic head as defined in claim 4, wherein a second magnetic film to constitute the second yoke part is formed so as to partially overlap the second pole portion after the dry-etching step.

7. A method of manufacturing a thin film magnetic head as defined in claim 3, wherein after the magnetic film to constitute the first yoke part of the first magnetic member is formed, a laminated film composed of the first pole portion, the write gap film and the second pole portion is formed on the magnetic film by a photolithography method and is dry-etched to narrow its width.

8. A method of manufacturing a thin film magnetic head as defined in claim 7, where a magnetic film to constitute the second yoke part is formed so as to partially overlap the second pole portion after the dry-etching step.

9. A method of manufacturing a thin film magnetic head as defined in claim 3, wherein the dry-etching step is firstly carried out to the track width of 1.5–2.5 $\mu$m to form the track width (W21) of not more than 1 $\mu$m finally.

10. A method of manufacturing a thin film magnetic head as defined in claim 3, wherein the dry-etching step is an ion beam milling process.

11. A method of manufacturing a thin film magnetic head as defined in claim 10, wherein in the ion beam milling process, etching is carried out with at least two ion incident angles, each angle being different, and wherein etching at the at least two ion incident angles selected is carried out at different incident timing lengths.

12. A method of manufacturing a thin film magnetic head as defined in claim 11, wherein the ion beam milling process using a first and a second ion incident angle is repeated several times.

13. A method of manufacturing a thin film magnetic head as defined in claim 12, wherein the first ion incident angle is selected to about 25–55 degrees from a line normal to the film constituting the first pole portion, and the second ion incident angle is selected to about 60–80 degrees from said line.

14. A method of manufacturing a thin film magnetic head as defined in claim 3, wherein in the dry-etching step, the substrate is rotated around an axis perpendicular to its surface.

15. A method of manufacturing a thin film magnetic head as defined in claim 3, wherein the dry-etching step is performed by the combination of an ion beam milling process and a reactive ion etching process.

16. A method of manufacturing a thin film magnetic head as defined in claim 15, wherein the second pole portion and the first pole portion are mainly etched by the ion beam milling process, and the write gap film is mainly etched by the reactive ion etching process.

17. A method of manufacturing a thin film magnetic head as defined in claim 1, further comprising the step of forming a magnetoresistive effective type thin film magnetic head so as to be supported by the substrate.

18. A method of manufacturing a thin film magnetic head as defined in claim 17, wherein firstly the magnetoresistive effective type thin film magnetic head is formed, on which the inductive type thin film magnetic head is laminate-formed.

* * * * *